US005635250A

United States Patent [19]
Blum et al.

[11] Patent Number: 5,635,250
[45] Date of Patent: *Jun. 3, 1997

[54] HYDRIDOSILOXANES AS PRECURSORS TO CERAMIC PRODUCTS

[75] Inventors: Yigal D. Blum, San Jose; Sylvia M. Johnson, Piedmont; Michael I. Gusman, Palo Alto, all of Calif.

[73] Assignee: SRI International, Menlo Park, Calif.

[ * ] Notice: The term of this patent shall not extend beyond the expiration date of Pat. No. 5,246,738.

[21] Appl. No.: 437,722

[22] Filed: May 9, 1995

Related U.S. Application Data

[63] Continuation-in-part of Ser. No. 240,153, May 10, 1994, abandoned, which is a continuation-in-part of Ser. No. 908,214, Jul. 2, 1992, Pat. No. 5,319,121, which is a continuation of Ser. No. 341,722, Apr. 21, 1989, Pat. No. 5,128,494, which is a continuation-in-part of Ser. No. 12,874, Dec. 1, 1986, Pat. No. 5,008,422, which is a continuation-in-part of Ser. No. 908,685, Mar. 4, 1986, Pat. No. 4,788,309, which is a continuation-in-part of Ser. No. 727,415, Apr. 26, 1985, Pat. No. 4,612,383.

[51] Int. Cl.$^6$ .................................................. B05D 3/02
[52] U.S. Cl. .................. 427/387; 427/376.2; 427/383.7; 427/228; 501/88
[58] Field of Search ................................. 501/88, 96, 97; 427/387, 383.7, 228, 126.2, 126.4, 376.2

[56] References Cited

U.S. PATENT DOCUMENTS

| 4,126,652 | 11/1978 | Oohara et al. ........................... 264/29.6 |
| 4,482,669 | 11/1984 | Seyferth et al. ......................... 524/442 |
| 4,666,872 | 5/1987 | Baney et al. ............................... 501/88 |
| 4,761,443 | 8/1988 | Lopes ........................................ 524/110 |
| 4,891,340 | 1/1990 | Semen et al. ............................... 501/88 |
| 4,904,424 | 2/1990 | Johnson ..................................... 264/29.2 |
| 4,952,715 | 8/1990 | Blum et al. ................................. 556/409 |
| 4,962,069 | 10/1990 | Burns et al. ................................. 501/90 |
| 5,008,422 | 4/1991 | Blum et al. ................................. 556/412 |
| 5,128,494 | 7/1992 | Blum ........................................ 556/457 |
| 5,190,709 | 3/1993 | Lukacs, III ................................. 264/63 |
| 5,208,284 | 5/1993 | Niebylski .................................. 524/382 |
| 5,219,925 | 6/1993 | Stephens .................................. 524/860 |
| 5,225,283 | 7/1993 | Leung et al. ............................. 428/408 |
| 5,231,059 | 7/1993 | Leung et al. ............................... 501/12 |
| 5,242,866 | 9/1993 | Leung et al. ............................... 501/12 |
| 5,246,738 | 9/1993 | Blum ........................................ 501/88 |
| 5,258,229 | 11/1993 | Lum et al. ................................. 501/88 |
| 5,272,239 | 12/1993 | Jensen ...................................... 501/88 |
| 5,283,019 | 2/1994 | Atwell et al. ............................. 501/88 |
| 5,306,554 | 4/1994 | Harrison et al. ......................... 428/283 |
| 5,328,976 | 7/1994 | Leung et al. ............................... 528/31 |
| 5,332,701 | 7/1994 | Bryson et al. ............................. 501/87 |
| 5,340,777 | 8/1994 | Leung et al. ............................... 501/12 |
| 5,358,910 | 10/1994 | Atwell et al. ............................. 501/88 |
| 5,386,006 | 1/1995 | Matsumoto et al. ...................... 528/4 |

FOREIGN PATENT DOCUMENTS

| 0098985 | 1/1984 | European Pat. Off. . |
| 0209360A2 | 1/1987 | European Pat. Off. . |
| 235810 | 9/1987 | European Pat. Off. . |
| 412428 | 2/1991 | European Pat. Off. . |
| 4016052A1 | 5/1990 | Germany . |
| 4023849A1 | 7/1990 | Germany . |
| 4023849A1 | 1/1992 | Germany . |
| 53-052521 | 5/1978 | Japan . |
| 57-077083 | 5/1982 | Japan . |
| 2230259 | 10/1990 | United Kingdom . |
| WO90/12835 | 11/1990 | WIPO . |
| WO93/01146 | 1/1993 | WIPO . |
| WO93/24423 | 12/1993 | WIPO . |
| WO94/05675 | 3/1994 | WIPO . |

OTHER PUBLICATIONS

Claussen et al., "Reaction Bonding of Aluminum Oxide (RBAO) Composites: Processing, Reaction Mechanisms and Properties" *J. Eur. Cer. Soc.* 0955–2219/94 pp. 97–109 (1994) no month.

Erny et al., "Microstructure Development of Oxycarbide Composites during Active–Filler–Controlled Polymer Pyrolysis" *J. A, Cer. Soc.* 76:(1):207–213 (1993) Jan.

Haug et al., "Processing, Properties and Structural Development of Polymer–derived Fiber–reinforced SiC" *Organic Silcon Chemistry: From Molecules to Materials*, ed. Norbert et al., Weinheim, Germany (1994) 303–317.

Plevyak et al., "Improved Rim Processing with Silicone Internal Mold Release Technology" *J. Cell. Plastics* Sep.–Oct.:363–368 (1984).

D. Seyferth, "Applications of Transition Metal Compounds in the Preparation of Useful Silicon–Containing Ceramics" *Organic Silcon Chemistry: From Molecules to Materials*, ed. Norbert et al., Weinheim, Germany (1994) 269–274 no month.

Wu et al., "Reaction Bonding and Mechanical Properties of Mullite/Silicon Carbide Composites" *J. Am. Cer. Soc.* 77(11):2898–2904 (1994) Nov.

Greil et al., "Microcrystalline Ceramic Composites by Active Filler Controlled Reaction Pyrolysis of Polymers," *Mat. Res. Soc. Symp. Proc.* 274:155–166 (1992) no month.

Seyferth et al., "Application of Preceramic Polymers in Powder Metallurgy: Their Use as Low–Loss Binders and for the in Situ Formation of Dispersed Ceramic Phases in the Metal Matrix," *Chem. Mater.* 6:10–12 (1994) no month.

Notification of Transmittal of the International Search Report or the Declaration, dated Sep. 14, 1995.

*Primary Examiner*—Mark L. Bell
*Assistant Examiner*—Louis M. Troilo
*Attorney, Agent, or Firm*—Reed & Robins

[57] ABSTRACT

A method is provided for preparing ceramic precursors from hydridosiloxane starting materials and then pyrolyzing these precursors to give rise to silicious ceramic materials. Si—H bonds present in the hydridosiloxane starting materials are catalytically activated, and the activated hydrogen atoms may then be replaced with nonhydrogen substituents. These preceramic materials are pyrolyzed in a selected atmosphere to give the desired ceramic product. Ceramic products which may be prepared by this technique include silica, silicon oxynitride, silicon carbide, metal silicates, and mullite.

55 Claims, No Drawings

HYDRIDOSILOXANES AS PRECURSORS TO CERAMIC PRODUCTS

REFERENCE TO GOVERNMENT SUPPORT

This invention was funded in part by the U.S. Department of Energy under Contract No. N00014-85C-0668. The United States Government has certain rights in this invention.

CROSS-REFERENCE TO RELATED APPLICATIONS

This application is a continuation-in-part of U.S. application Ser. No. 08/240,153, filed May 10, 1994, now abandoned which is a continuation-in-part of U.S. application Ser. No. 07/908,214, filed Jul. 2, 1992, now issued as U.S. Pat. No. 5,319,121, which is a continuation of U.S. application Ser. No. 07/341,722, filed Apr. 21, 1989, now issued as U.S. Pat. No. 5,128,494, which is a continuation-in-part of U.S. application Ser. No. 07/012,874, filed Dec. 1, 1986, now issued as U.S. Pat. No. 5,008,422, which is a continuation-in-part of U.S. application Ser. No. 06/908,685, filed Mar. 4, 1986, now issued as U.S. Pat. No. 4,788,309, which is a continuation-in-part of U.S. application Ser. No. 06/727,415, filed Apr. 26, 1985, now issued as U.S. Pat. No. 4,612,383. Also related to the present application are U.S. Pat. Nos. 4,952,715 and 5,055,431.

TECHNICAL FIELD

This invention relates generally to preceramic polymers and preparation of ceramic products therefrom. More particularly, the invention relates to the use of hydritridosiloxanes as precursors to ceramic products such as silica, silicon oxynitride, silicon carbide, and metal silicates.

BACKGROUND OF THE INVENTION

The invention relates primarily to: (1) the preparation of materials that are useful precursors to ceramic materials; (2) catalytic activation of Si—H bonds; and (3) preparation of ceramic materials using the ceramic precursors of the invention in combination with metal and/or ceramic powders. The invention also concerns, in one embodiment, the use of sol-gel processing techniques.

The sol-gel process is an important route for advanced metal-oxide glasses and ceramics. The method is currently used or of potential for protective, optical and electronic coatings, optical fiber preforms, nonlinear optical devices, dielectrics or superconductors, display materials, and structures. The sol-gel technique provides a relatively low temperature, controlled method of producing a large variety of shapes such as monodispersed particles, uniform coatings, fibers, dense or porous articles, and mixed metal oxides having controlled stoichiometry and purity at the molecular level.

The sol-gel process has been based mostly on the same group of starting materials, the metal alkoxides, carboxylates and diketonates. These precursors are hydrolyzed, then condensed in the presence of an alcohol/water solution to form a gel which is dried and fired to give the final product. Chemical control of product formation is manipulated by temperature, type of catalyst and pH as well as by the type and ratio of reactants in solution. See, e.g., C. J. Brinker et al., in "Ultrastructure Processing of Ceramics, Glasses and Composites I" (1984), at pp. 43 et seq.

Thus, the reaction procedure controls to a large extent the morphology of the final gel, and, therefore, the final ceramic microstructure as well. Low water content and/or acidic conditions will give spinnable gels because the precursor polymer will, as noted above, be substantially linear. Higher water content will give slightly crosslinked, coatable gels, while a very high water content and/or basic conditions will give highly crosslinked gel products that are useful in casting processes and for powder formation. See B. J. J. Zelinski et al., *J. Phys. Chem. Solids* 45:1069 (1984), and L. C. Klein et al., *Ann. Rev. Mat. Sci.* 15:227 (1985).

It has recently been suggested that alkoxide-siloxane oligomers may serve as molecular building blocks for unique ceramic silica structures (V. W. Day et al., *J. Am. Chem. Soc.* 107:8264 (1985)). A rigid cubic alkoxysesquisiloxane, $[Si_8O_{12}](OCH_3)_8$, offers the possibility of generating porous materials, yet rigid due to the molecular block structure.

As noted above, the invention also relates to preparation of preceramic polymers, i.e., polymers which may be converted upon pyrolysis to ceramic products. The present invention provides preceramic siloxane polymers which are useful for preparing a wide variety of silicious ceramic materials and articles, e.g., articles such as fibers, films, shaped products, and the like, comprising materials such as silica, silicon oxynitride, silicon carbide, or metal silicate.

The preceramic polymers, or "ceramic precursors," of the invention are prepared by catalytic activation of Si—H bonds. To date, catalytic activation of Si—H bonds has mainly been used for hydrosilylation reactions of unsaturated compounds, as illustrated by reactions (1) and (2):

$$R_3Si-H + M \rightarrow R_3Si-M-H \quad (1)$$

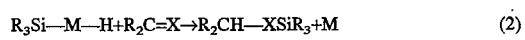

$$R_3Si-M-H + R_2C=X \rightarrow R_2CH-XSiR_3 + M \quad (2)$$

$(X = O, CR_2)$

Over the past 25 years, numerous homogeneous and heterogeneous catalysts have been found which promote these reactions. See, e.g., J. L. Speier et al., *J. Am. Chem. Soc.* 79:974 (1957). Typical applications of these reactions have been in organic synthesis or in the crosslinking of silicon rubbers (J. P. Collman et al., in "Principles and Applications of Organotransition Metal Chemistry," pp. 384–392, University Science Books, 1980). Only recently have such reactions been found useful in another application, crosslinking of pre ceramic polymers, as described in co-pending, commonly assigned application Ser. No. 012,874, the disclosure of which is hereby incorporated by reference in its entirety.

Related reactions involving substitution at an Si—H bond have been used to form compounds containing Si—Y groups wherein Y is, for example, halogen, alkoxy, or substituted or unsubstituted amino:

$$R_3Si-H + H-Y \xrightarrow{catalyst} R_3Si-Y + H_2 \quad (3)$$

L. H. Sommer et al., *J. Org. Chem.* 32:4270 (1967). Only mono- and di-substituted aminosilanes, halosilanes and alkoxysilanes have been synthesized by this method. Surprisingly, there have been virtually no attempts to enlarge the potential capability of reaction (3). For example, the inventors herein are unaware of any work involving reaction of compounds containing multiple Si—H bonds with water to form oligomeric or polymeric siloxane products.

Investigators at SRI, the assignee of the present application, have discovered that catalytic activation of Si—H bonds is extremely useful in the synthesis of polysilazane ceramic precursors, according to reaction (4):

$$R_2SiH_2 + RNH_2 \xrightarrow{\text{catalyst}} [R_2SiNR]_x + H_2 \quad (4)$$

(R = H, alkyl)

To date, however, efforts have not been focused on enlarging the scope of the analogous reaction in the presence of water, i.e., instead of using ammonia or monoalkylamines. Preliminary research indicates that similar reactions (as illustrated by reactions (5) and (6)) will occur in the presence of water, to produce monomeric, oligomeric or polymeric siloxanes, at room temperature, or lower:

$$R_3SiH + H_2O \xrightarrow[Ru_3(CO)_{12}]{30° C.} R_3SiOH + R_3SiOSiR_3 + H_2 \quad (5)$$

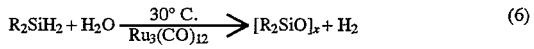

$$R_2SiH_2 + H_2O \xrightarrow[Ru_3(CO)_{12}]{30° C.} [R_2SiO]_x + H_2 \quad (6)$$

The present invention is directed to a new approach to polymer processing, and involves combining the fields of research summarized hereinabove: (a) preparation of preceramic materials, particularly preceramic polymers, useful in making ceramic materials; and (b) reaction of hydridosiloxane compounds by catalytic activation of the Si—H bonds contained therein. In a preferred embodiment, the invention also involves the use of (c) sol-gel processing techniques. Gels or ceramic precursors produced using the present method are highly "processable" and, upon pyrolysis, give the desired ceramic material in relatively high yield.

The invention is also directed to a novel method for preparing ceramic materials which involves admixture of the gels or ceramic precursors produced using the present method with a metal powder, a ceramic powder, or mixtures thereof, prior to conducting pyrolysis. This method can be used, for example, in the preparation of mullite, $3Al_2O_3 \cdot 2SiO_2$. Although mullite is a naturally occurring mineral, it is generally formed either as a product of heated aluminosilicate or synthetically from mixtures of aluminum and silicon sources. Such techniques are, however, time consuming and require many preparation steps. The method of the invention, by contrast, provides a simple, straightforward way of making materials such as mullite or mullite-containing composites, and further provides a method for making such materials in the form of coatings, composite matrices, structural monolithic ceramics, and the like.

In addition to the references mentioned above, the following relate to one or more aspects of the present invention, and reference may be had thereto for background information not explicitly included herein.

U.S. Pat. No. 5,225,283 to Leung et al. describes a process in which a cyclosiloxane monomer containing a filler is applied as a coating to a substrate and then pyrolyzed. The filler may be silicon carbide, silicon nitride, or the like, in the form of a powder, fibers or whiskers.

U.S. Pat. Nos. 5,231,059 and 5,266,533 to Leung et al. relate to a process for preparing black glass composites by reacting cyclosiloxane monomers in the presence of reinforcing fibers, such as of silicon carbide, silica glass, silicon nitride, or the like, and then pyrolyzing the mixture.

U.S. Pat. No. 5,306,554 to Harrison et al. relates to the preparation of fiber-reinforced ceramic matrix composites containing ceramic particles such as oxides of aluminum, silicon, calcium and zirconium.

PCT Publication No. WO94/05675 describes preparation of a carbon-containing black glass synthesized by heating a spirosiloxane polymer in a non-oxidizing atmosphere. The process is also stated to be useful in the preparation of matrix composites by conducting pyrolysis in the presence of a filler such as of silicon carbide, silicon nitride, silica, etc.

Claussen et al., *J. Eur. Ceram. Soc.* 5:29–35 (1989) and 9:97–109 (1994), describe a method for making aluminum oxide-based composites by heat treating an aluminum/aluminum oxide powder to yield aluminum oxide crystallites. The aluminum oxide crystallites in turn sinter and bond the originally present ceramic particles.

Erny et al., *J. Am. Ceram. Soc.* 76(1):207–213 (1993), relates to preparation of ceramic composite materials using polysiloxane precursors and titanium powder.

SUMMARY OF THE INVENTION

Accordingly, it is a primary object of the invention to use catalytic Si—H bond activation to produce precursors to ceramic products.

It is another object of the invention to use catalytic Si—H bond activation, in conjunction with sol-gel processing techniques, to produce ceramic precursors.

It is still another object of the invention to use catalytic Si—H bond activation to provide ceramic precursors from hydridosiloxane starting materials, such that hydrogen atoms present in the starting material are replaced with nonhydrogen substituents.

It is yet another object of the invention to provide a method of making such ceramic precursors in which catalytically activated Si—H bonds in the hydridosiloxane starting material are replaced with Si—C, Si—N, Si—O, Si-Metal, or other linkages.

It is a further object of the invention to provide a method of making silicious ceramic products by pyrolyzing ceramic precursors synthesized via catalytic Si—H bond activation of hydrosiloxane starting materials.

It is still a further object of the invention to provide a method of making silica, silicon oxynitride, silicon carbide, metal silicates or other ceramic materials by curing and then pyrolyzing various ceramic precursors as described herein.

It is yet a further object of the invention to provide a method of making ceramic materials, particularly shaped articles and coatings, by curing and then pyrolyzing ceramic precursors or gels produced therefrom in the presence of a reactive and/or nonreactive filler material such as metal powder or ceramic powder.

It is yet another object of the invention to provide a method for making ceramic materials with little or no shrinkage upon pyrolysis, by incorporating reactive metal materials, e.g., metal powders or the like, into the preceramic mixture fabricated from a silicon-containing starting material.

Additional objects, advantages and novel features of the invention will be set forth in part in the description which follows, and in part will become apparent to those skilled in the art upon examination of the following, or may be learned by practice of the invention.

In one aspect of the invention, a method is provided for preparing a ceramic precursor, which comprises: (a) providing a hydridosiloxane starting material containing a plurality of Si—H groups; and (b) reacting the hydridosiloxane starting material with a hydroxyl-containing compound R'—OH, wherein R' is hydrogen, $C_1$-$C_{10}$ alkyl, or aryl of 1–2 rings (and may be substituted with one or more substituents which do not significantly hinder the reaction), in an inert atmosphere in the presence of a catalyst effective to activate Si—H bonds, to give a ceramic precursor in which hydrogen atoms have been replaced by oxygen-containing pendant groups —OR' or by oxygen-containing crosslinking moieties.

In other aspects of the invention, ceramic precursors are provided using a similar method, i.e., one which involves catalytic activation of Si—H bonds in a hydridosiloxane starting material, but which provides preceramic materials in which the "activated" hydrogen atoms have been replaced with nonhydrogen, nonalkoxy substituents, e.g., nitrogen-containing, carbon-containing, or organometallic groups.

In still other aspects of the invention, silicious ceramic materials are prepared by: (1) catalytic activation of Si—H bonds in a hydridosiloxane starting material; (2) replacement of the activated hydrogen atoms by nonhydrogen substituents; and (3) pyrolysis at a selected temperature and in a selected atmosphere, to give the desired ceramic product. Depending on the pyrolysis temperature, the particular polysiloxane preceramic, and on the pyrolysis atmosphere, ceramic materials may be provided which comprise silica, silicon oxynitride, silicon carbide, metal silicates, or mixtures thereof.

In still further aspects of the invention, the hydridosiloxane starting material of the aforementioned processes is treated with water in the presence of an acid or base catalyst after an initial catalytic Si—H bond activation reaction which introduces pendant alkoxy groups. Such a step is in conformance with standard sol-gel processing techniques, and extends the degree of polymerization in or crosslinks the product. Typically, this step provides a polymeric gel.

In still additional aspects of the invention, the aforementioned silicious ceramic precursors or gels produced therefrom are pyrolyzed in the presence of a metal powder and/or a ceramic powder. In this way, silicon-containing ceramic materials are produced which contain an oxidized metal in addition to silicon itself. One important application of this technique is in the preparation of mullite-producing mixtures that can be used to infiltrate fiber preforms and thus produce mullite or mullite-containing matrix composites. This technique may also be used to provide structural monolithic ceramics, ceramic coatings, fibers, fiber-reinforced composite matrices, and the like.

DETAILED DESCRIPTION OF THE INVENTION

A. Definitions and Nomenclature.

Before the present compounds, compositions and methods are disclosed and described, it is to be understood that this invention is not limited to specific synthetic methods, specific energetic formulations, or the like, as such may vary. It is also to be understood that the terminology used herein is for the purpose of describing particular embodiments only and is not intended to be limiting.

It must be noted that, as used in the specification and the appended claims, the singular forms "a", "an" and "the" include plural referents unless the context clearly dictates otherwise. Thus, for example, reference to "a hydridosiloxane polymer" includes mixtures of hydridosiloxane polymers, reference to "a metal powder" includes mixtures of metal powders, reference to "a ceramic powder" includes mixtures of ceramic powders, and the like.

In this specification and in the claims which follow, reference will be made to a number of terms which shall be defined to have the following meanings:

"Hydridosiloxanes" as used herein are compounds which contain one or more silicon-hydrogen bonds and one or more silicon-oxygen bonds. The term is intended to include oligomeric, cyclomeric, polymeric and copolymeric hydridosiloxanes. Typically, the hydridosiloxanes used as starting materials herein will contain multiple Si—H functional groups, although it is not essential that every silicon atom be bound to a hydrogen atom. Generally, the hydridosiloxane preceramic material will be such that at least about 20% of the silicon atoms contained therein will have a hydrogen atom bound thereto.

The term "polymer" is intended to include both oligomeric and polymeric species, i.e., compounds which include two or more monomeric or cyclomeric hydridosiloxane units. The term is intended to include both homopolymers and copolymers.

The "ceramic yield" of a compound upon pyrolysis indicates the ratio of the weight of the ceramic product after pyrolysis to the weight of the compound before pyrolysis.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. The term "lower alkyl" intends an alkyl group of one to six carbon atoms.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing one to six carbon atoms.

The term "aryl" as used herein refers to a monocyclic or bicyclic aromatic species. Optionally, these groups are substituted with one to four, more preferably one to two, lower alkyl, lower alkoxy, hydroxy, and/or nitro substituents.

"Halo" or "halogen" refers to fluoro, chloro, bromo or iodo, and usually relates to halo substitution for a hydrogen atom in an organic compound.

"Silyl" as used herein is an

—SiX$_2$— or —SiX$_3$ moiety wherein X is hydrogen, lower alkyl, lower alkenyl or amino, unsubstituted or substituted with 1 or 2 lower alkyl or lower alkenyl groups. The "silyl" moiety may be part of a silicon-containing oligomer, cyclomer or polymer.

Hydridosiloxane "coupling agents" as used herein are intended to include any chemical reagent which is capable of bridging two hydridosiloxane units and thus providing for polymerization and/or crosslinking. The coupling agent typically has the formula H—Z—H, wherein Z is oxygen, sulfur, phosphoro, amino (unsubstituted or substituted with one or more lower alkyl or silyl groups), —O—, —O—Y—O—, —NX—NX—, or —NX—Y—NX—, where Y is a linking group, typically lower alkyl or silyl, and X is typically lower alkyl, silyl, or hydrogen —Z— bridges between silicon atoms of two hydridosiloxane monomeric or cyclomeric units.

B. Preparation of Ceramic Precursors.

B.1. Overview:

The method of the present invention involves preparation of ceramic precursors, typically although not necessarily polysiloxane precursors, by catalytic Si—H bond activation of a hydridosiloxane starting material. While a number of different types of reactions and products are encompassed by the present method, each reaction involves catalytic activation of Si—H bonds in the selected hydridosiloxane starting material, and replacement of the activated hydrogen atoms therein.

Table 1 illustrates the various pathways and products of the invention:

TABLE 1

Starting material: Polymer containing the structure $[RSiHO]_n$

| | Pathway | Primary Product |
|---|---|---|
| I. | Pyrolyze directly | $SiO_2/SiC/C$, $Si_2ON_2$ (depending on R, temperature and pyrolysis atmosphere) |
| II. A. | Substitute with alkoxy groups OR': react with R'OH | $[RSiHO]_l[RSiO]_m$<br>\|<br>OR' |
| B. | Sol-gel: prepare by catalytically reacting product of II.A. with water | $[RSiHO]_l[RSiO]_m$<br>\|<br>O<br>\|<br>$[RSiHO]_l[RSiO]_m$ |
| C. | Pyrolyze product of II.A. or II.B. | |
| | 1. Under inert atmosphere | $SiO_2/SiC/C$ |
| | 2. Under reactive amine atmosphere | $Si_2ON_2/SiO_2$ |
| | 3. Under $O_2$ | $SiO_2$ |
| III. A. | Sol-gel: prepare by catalytically reacting with water | $[RSiHO]_l[RSiO]_m$<br>\|<br>OH |
| B. | Pyrolyze product of III.A. directly | |
| | 1. Under inert atmosphere | $SiO_2/SiC/C$ |
| | 2. Under reactive amine atmosphere | $Si_2ON_2/SiO_2$ |
| | 3. Under $O_2$ | $SiO_2$ |
| C. | React product of III.A. with an organometallic complex $ML_a$, in the presence of a catalyst | $[RSiHO]_l[RSiO]_m$<br>\|<br>$L_bM-O$ |
| D. | Pyrolyze product of III.C. | |
| | 1. Under $O_2$ | $M_xSi_yO_z$ |
| | 2. Under reactive amine atmosphere | $M_xSi_yO_zN_w$ (e.g., "Sialon") |
| IV. A. | Substitute with hydrocarbon: catalytically react with a compound containing an unsaturated carbon-carbon bond | $[RSiHO]_l[RSiO]_m$<br>\|<br>R |
| B. | Pyrolyze | |
| | 1. Under inert atmosphere | $SiO_2/SiC/C$ |
| | 2. Under reactive amine atmosphere | $Si_2ON_2/SiO_2$ |
| | 3. Under $O_2$ | $SiO_2$ |
| V. A. | Substitute with amine: catalytically react with a secondary amine NR"H | $[RSiHO]_l[RSiO]_m$<br>\|<br>$NR"_2$ |
| B. | Crosslink with amine: catalytically react with primary amine NR"$H_2$ or ammonia | $[RSiHO]_l[RSiO]_m$<br>\|<br>N—<br>\|<br>$[RSiHO]_l[RSiO]_m$ |
| C. | Pyrolyze | |
| | 1. Under inert atmosphere, OR | $Si_2ON_2/SiO_2/SiC/C$ |
| | 2. Under reactive amine atmosphere | $SiON_2/SiO_2$ |
| | 3. Under $O_2$ | $SiO_2$ |
| VI. A. | Substitute with organometallic group: | $[RSiHO]_l[RSiO]_m$<br>\|<br>$LML_{a-1}$ |
| | 1. Catalytically react with $ML_a$ | $[RSiHO]_l[RSiO]_m$<br>\|<br>$ML_b$ |
| | OR 2. Catalytically react with $L_aM$-OH | $[RSiHO]_l[RSiO]_m$<br>\|<br>$OML_b$ |
| B. | Pyrolyze products of either VI.A.1. or VI.A.2. | |
| | 1. Under $O_2$ | $M_xSi_yO_z$ |
| | 2. Under reactive amine atmosphere | $M_xSi_yO_zN_w$ |
| VII. | React with coupling agent H-Z-H | |

TABLE 1-continued

Starting material: Polymer
containing the structure [RSiHO]$_n$

| Pathway | Primary Product |
|---|---|
| 1. [RSiHO]$_n$ | [RSiO]<br>  \|<br>  Z<br>  \|<br>[RSiO] |
| 2. Cyclomeric starting material | |

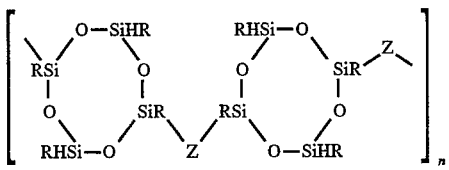

The hydridosiloxane starting material is a polymer which contains recurring mer units having the structure —[RSiHO]—, i.e., —[RSiHO]$_n$— wherein n indicates the number of recurring mer units in the polymer, and wherein R is selected from the group consisting of: hydrogen; hydroxyl; $C_1$–$C_{10}$ alkyl or alkoxy, which may be either unsubstituted or substituted with hydroxyl, lower alkyl, lower alkoxy, halogeno, silyl, or NR"$_2$ groups, wherein R" is hydrogen or lower alkyl; aryl of 1–2 rings, which may be similarly substituted; NR$_2$"; silyl; and ML$_a$, OML$_a$, or NR"ML$_a$, wherein ML$_a$ is an organometallic compound, and may be an oligomer or cluster. This hydridosiloxane starting material will frequently be commercially available, or it may be synthesized from an unsubstituted monomeric or polymeric hydridosiloxane using the catalytic Si—H bond activation/substitution reaction described herein. Cyclomers such as

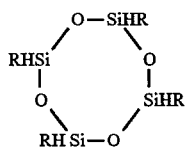

may be used as well, as may hydridosiloxane copolymers. Suitable hydridosiloxane copolymers include the mer unit —[RSiHO]—, as above, combined with other types of monomers to improve polymeric and pyrolytic properties. Any such copolymers are considered to be equivalent, for purposes of the invention, to the homopolymer —[RSiHO] $_n$—. Preferred monomer units for incorporation into a hydridosiloxane copolymer include but are not limited to, the following structures (wherein R is as defined above):

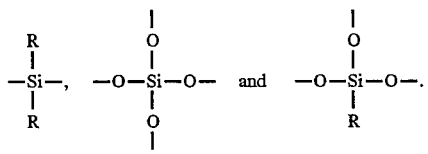

It is required that the aforementioned reactions for preparing ceramic precursors be carried out in the presence of a catalyst. Virtually any catalyst may be used, so long as it does not actively interfere in the reaction and is effective to the activate Si—H bonds of the precursor. Suitable catalysts include acid catalysts such as HCl, $H_2SO_4$, HBr, $NH_4Cl$, $NH_4Br$, $AlCl_3$, $BCl_3$ and $H_3PO_4$, basic catalysts such as NaOH, KOH, $Ca(OH)_2$, $NH_3$ and pyridine, and metal catalysts, particularly transition metal catalysts such as those indicated in Tables 2 and 3 below. Table 2 sets forth homogeneous catalysts which dissolve in the reactants. Heterogeneous catalysts such as those of Table 3 may also be used, as can mixtures of homogeneous catalysts and/or heterogeneous catalysts. (It should be pointed out here that the "homogeneous" and "heterogeneous" classifications are made on the basis of solubility in common organic solvents such as alcohols. However, it is not uncommon that during the reactions, homogeneous catalysts may be converted to a heterogeneous form and vice versa.) These catalysts may include any number of ligands, usually 1–6, including carbonyl, amino, halo, silyl, hydrido, phosphine, arsine and organic ligands.

The reaction involving catalytic activation of Si—H bonds in the hydridosiloxane starting material —[RSiHO] $_n$— is preferably carried out under an inert atmosphere, e.g., under argon, nitrogen, or the like. Also, it is preferred that the reaction be carried out at temperatures of 0° C. to 200° C., more preferably 0° C. to 40° C. The use of an inert organic solvent, is optional.

The catalyst(s) may be supported on a polymer, inorganic salt, carbon or ceramic material or the like. The heterogeneous catalyst may be provided in a designated shape, such as in particles, as porous plates, etc.

The concentration of catalyst will usually be less than or equal to about 5 mole percent based on the total number of moles of reactants, usually between about 0.1 and 5 mole percent. In some instances, however, catalyst concentration will be much lower, on the order of 20 to 200 ppm.

Table 2, Homogeneous Catalysts $H_4Ru_4(CO)_{12}$, $Fe(CO)_5$, $Rh_6(CO)_{16}$, $Co_2(CO)_8$, $(Ph_3P)_2Rh(CO)H$, $H_2PtCl_6$, nickel cyclooctadiene, $Os_3(CO)_{12}$, $Ir_4(CO)_{12}$, $(Ph_3P)_2Ir(CO)H$, $NiCl_2$, $Ni(OAc)_2$, $Cp_2TiCl_2$, $(Ph_3P)_3RhCl$, $H_2Os_3(CO)_{10}$, $Pd(Ph_3P)_4$, $Fe_3(CO)_{12}$, $Ru_3(CO)_{12}$, transition metal hydrides, transition metal salts (e.g., $ZnCl_2$, $RuCl_3$, $NaHRu_3(CO)_{11}$) and derivatives, $PdCl_2$, $Pd(OAc)_2$, $(dCN)_2PdCl_2$, $[Et_3SiRu(CO)_4]_2$, $(Me_3Si)_2Ru(CO)_4$, $[Me_2SiXSiMe_2]Ru(CO)_4$, $Pt(HO_2Si$-vinyl-OSi-vinyl-Me$_x$), $Pt[(HOSi$-vinyl-O)$_4$] and mixtures thereof.

Table 3, Heterogeneous Catalysts

Pt/C, Pt/BASO$_4$, Cr, Pd/C, Co/C, Pt black, Co black, Ru black, Ra—Ni, Pd black, Ir/Al$_2$O$_3$, Pt/SiO$_2$, Rh/TiO$_2$, Rh/La$_2$O$_3$, Pd/Ag alloy, LaNi$_5$, PtO$_2$, and mixtures thereof.

B.2. Substitution of —[RSiHO]$_n$— with alkoxy moieties:

The preferred method of the present invention involves preparation of a polysiloxane preceramic by reaction of a hydridosiloxane polymer with an alcohol. The reaction involves catalytic activation of Si—H bonds in the hydridosiloxane starting material, and replacement of the "activated" hydrogen atoms therein with alkoxy groups, as indicated in Section II of Table 1.

The hydridosiloxane may be represented as containing one or more mer units having the structure

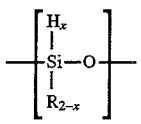

wherein x is 1 or 2. Reaction of this starting material with a hydroxyl-containing reactant R'OH, wherein R' is hydrogen or a lower alkyl moiety and is different than R, yields the polysiloxane preceramic

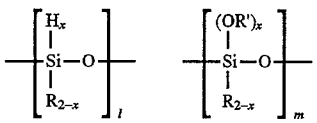

in which, as may be deduced from the structure, hydrogen atoms of the hydridosiloxane starting material have been replaced by new, OR', alkoxy moieties The relative amounts of unsubstituted and alkoxy-substituted mer units are indicated by the subscripts l and m, respectively. (Reaction with water, i.e., wherein R' is hydrogen, is described in Section B.6. below.)

This preceramic may be pyrolyzed directly to give the products enumerated in Table 1. Alternatively, it may be processed prior to pyrolysis according to the sol-gel method described in Section B.5., below, to give a preceramic gel (see Section II of Table 1). The gel, while yielding the same ceramic product as its linear precursor, provides higher ceramic yields and does not melt upon pyrolysis.

In a related reaction, the hydridosiloxane starting material is monomeric rather than polymeric, and initially substituted with alkoxy groups, i.e., it is a monomeric silane substituted with one, two or three alkoxy groups "OR$^1$." The monomeric silane may thus be represented by the formula H$_m$Si(OR$^1$)$_{4-m}$ wherein m is 1, 2 or 3. In a first type of reaction involving this monomeric starting material, the compound is reacted with an alcohol R$^2$OH in the presence of a catalyst effective to activate Si—H bonds so that activated hydrogen atoms are replaced by new alkoxy moieties "OR$^2$." R$_1$ and R$_2$ are typically C$_1$-C$_{10}$ alkyl or alkoxy moieties, or aryl of 1-4, preferably 2-3 rings, more typically lower alkyl groups, and may be either unsubstituted or substituted as for the substituent "R," discussed above. The resulting structure may be represented as Si(OR$^1$)$_{4-m}$(OR$^2$).

This latter compound may be hydrolyzed to give a polysiloxane ceramic precursor; hydrolysis will again be carried out in the presence of a catalyst effective to activate hydrolysis. The differential in hydrolysis rates of the two different types of alkoxy moieties —OR$^1$ and —OR$^2$ is useful in dictating the type of polymer which result upon gelation (i.e., upon hydrolysis). Where there is a substantial difference in hydrolysis rates, a more linear polymer will be produced, while if hydrolysis rates are approximately the same (for example, when R$_1$ and R$_2$ represent the same substituents), a crosslinked structure will result.

(A second type of reaction involving the aforementioned monomeric silane is simple hydrolysis to give a polymeric alkoxy-substituted siloxane, containing pendant —OR$^1$ moieties.)

B.3. Introduction of additional carbon: When the ceramic product ultimately desired is to include carbon, e.g., as silicon carbide, it is preferred that the ceramic precursor be modified to increase the mole fraction of carbon therein. In such a case, as illustrated in Section IV of Table 1, the hydridosiloxane starting material —[RSiHO]$_n$— is reacted, in the presence of a catalyst effective to activate Si—H bonds, with a compound containing an unsaturated carbon-carbon bond. The compound may be alkenyl or alkynyl, and of any size and containing any number and kind of substituents, so long as potential steric interference is minimized and the substituents do not hinder the reaction. In general, the reaction may be represented as introducing pendant —(CH$_2$)$_2$—R species in place of the activated hydrogen atoms, by reaction with —CH=CH—R (or —C≡C—R) with R as defined hereinabove.

Pyrolysis of the carbon-rich polysiloxane precursor will give ceramic products as indicated in Table 1, Section IV.

B.4. Amine substitution: When it is desired that the ceramic material include nitrogen, e.g., as silicon nitride or silicon oxynitride, the hydridosiloxazane starting material —[RSiHO]— is reacted with ammonia or a primary or secondary amine in which the substituents, if any, are lower alkyl, in the presence of a catalyst effective to activate Si—H bonds. When the amine reactant is a secondary amine, the reaction will result in a structure in which the linearity of the siloxane polymer is substantially maintained, but in which the activated hydrogen atoms in the starting material have been replaced by pendant amine groups. When the amine reactant is ammonia or a primary amine, a crosslinked siloxazane structure in which polysiloxane chains are joined through —NH— or —NR"— linkages results (Section V of Table 1). Additional information concerning this latter reaction may be found in parent application Ser. No. 012,874, incorporated by reference hereinabove.

Pyrolysis of either the linear or crosslinked ceramic precursor in which nitrogen-containing moieties have been incorporated as above will result in: (1) a mixture of silicon oxynitride, silica, silicon carbide and carbon, when pyrolysis is conducted in an inert atmosphere; (2) a mixture of silicon oxynitride and silica, when pyrolysis is conducted in a reactive amine atmosphere, e.g., in ammonia or methylamine; (3) silica, when pyrolysis is conducted in oxygen.

B.5. Substitution with organometallic species: In an equally important embodiment of the present invention, organometallic species are introduced into the siloxane precursor prior to pyrolysis. Pyrolysis will then give metal silicates, which (depending on the pyrolysis atmosphere) may or may not contain nitrogen.

Several routes may be taken to introduce organometallic species into the polysiloxane precursor. First, the hydridosiloxane starting material —[RSiHO]$_n$— may be directly reacted with an organometallic compound ML$_a$, wherein M is a metal atom, L represents one or more organic or inorganic ligands associated therewith, and "a" represents the mole ratio of L to M in the compound. "ML$_a$" may be monomeric or oligomeric; it may also represent a cluster. As above, the reaction is carried out in the presence of a catalyst effective to activate Si—H bonds, so that the activated hydrogen atoms are replaced with the organometallic species. Depending on the particular metal and ligand, the activated silicon atoms may bind either to the metal or to the ligand, to give either Si—M or Si—LM bonds in the resultant ceramic precursor.

Examples of representative "M" elements include lithium, sodium, potassium, magnesium, calcium, boron, aluminum and phosphorus, as well as the transition metals, lanthanides and actinides. Examples of suitable ligands include carbonyl, cyano, nitrate, sulfate, amino, amido, silyl, cyano-cyclopentadienyl ("Cp"), phenyl ("Ph"), halide, metal clusters, alkoxy, carbonyl, and $\alpha C\equiv C\alpha$, where $\alpha$ is alkyl, particularly lower alkyl, or aryl, such as phenyl.

Second, the hydridosiloxane starting material —[RSiHO]$_n$— may be reacted: (1) with water, as described above, to give pendant hydroxyl groups in the ceramic precursor; and subsequently (2) with the organometallic compound $ML_a$. In this case, in contrast to the reaction just described, the organometallic species bind to the silicon atoms of the polysiloxane chain via oxygen bridges, i.e., Si—H bonds are replaced by Si—$OML_b$ linkages, wherein b represents the mole ratio of L to M in these pendant groups.

Third, the hydridosiloxane starting material —[RSiHO]$_n$— may be directly reacted with a compound $ML_a$—OH or M—OH, i.e., a compound containing a metal element and which includes one or more hydroxyl groups. As before, the reaction is carried out in the presence of a catalyst effective to activate Si—H bonds, although in some cases, i.e., when the metal-containing compounds serve a catalytic function, an added catalyst may be omitted. The ceramic precursor which results here is similar to that obtained in the reaction just described, in which Si—H bonds are replaced by Si—$OML_b$ linkages. Examples of metal-containing compounds suitable for this reaction include CpFeCp—OH, Cp$_2$Ti(OH)$_2$, NaOH, KOH, R$_3$Si—OH, R$_2$B—OH, and the like, wherein R is as defined earlier herein. In this type of reaction, it may be possible to omit an added catalyst, as these metal-containing compounds may serve as catalysts as well as reactants.

Pyrolysis of ceramic precursors which have been modified to include organometallic groups yields metal silicates that may be represented by the formula $M_xSi_yO_z$. Pyrolysis under an amine atmosphere, or pyrolysis of a precursor that has been modified to include nitrogen as well as a metal (as described above), will yield a metal-containing silicious ceramic material that additionally contains nitrogen, $M_xSi_yO_zN_w$, wherein x, y, z and w represent the combining proportion of M, Si, O and N in the ceramic product.

B.6. Sol-gel processing: The alkoxy-substituted hydridosiloxane prepared in Section B.2. may, if desired, be processed using sol-gel techniques. The reaction is a hydrolysis step carried out using conventional sol-gel processing methodology as described, for example, by C. J. Brinker et al., in "Better Ceramics Through Chemistry," eds. C. J. Brinker et al., Mat. Res. Soc. Symposium Proceedings 32 (1984), at page 25, cited above. Hydrolysis introduces pendant hydroxyl groups into the polysiloxane structure as well as some degree of coupling or cross-linking. The product obtained may be either pyrolyzed directly (see Section C) or substituted as described in the preceding sections.

As with the reactions described in Sections B.2. through B.5., hydrolysis is typically carried out at a temperature in the range of about 0° C. to 40° C., preferably at room temperature or lower. The reaction medium is typically aqueous alcohol, and the preferred mole ratio of water to hydridosiloxane starting material is on the order of 0.1 to 8, more preferably 0.1 to 4, most preferably 0.1 to 2. Increasing the amount of water present will typically give a more crosslinked product, while reducing the amount of water will correspondingly give a more linear product. The reaction is carried out catalytically, with Lewis acid or base catalysts preferred. Examples of suitable catalysts for this reaction are as set forth above.

B.7. Reaction with a coupling agent: If desired, the polymer obtained upon catalytic Si—H bond activation and substitution may be further reacted with a coupling agent H—Z—H as defined above. Such a reaction provides —Z— bridges between hydridosiloxane units (which may be either oligomeric, polymeric or cyclomeric), either extending the degree of polymerization of or crosslinking the product. Functionally equivalent compounds, such as those containing unsaturated bonds, may be used as well, e.g., vinyl or allyl alcohols.

Alternatively, a monomeric, oligomeric or cyclomeric hydridosiloxane starting material, (e.g., a cyclomeric material as described in Section B.1.), may be directly treated with a coupling agent H—Z—H in a dehydrocoupling reaction to give a coupled hydridosiloxane product. The coupled product may be pyrolyzed as is, substituted first using the reactions of B.2. through B.5., or processed via a sol-gel method as described in Section B.6.

These latter two reactions are illustrated schematically in Section VII of Table 1.

C. Pyrolysis.

Another important advantage of the compositions and methods of the present invention is the specificity and degree of ceramic yield upon pyrolysis. Generally, an increase in the oxygen content of the ceramic precursor will result in a higher oxygen content in the ceramic product, while an increase in the carbon content of the precursor will result in a higher carbon content in the ceramic product. In addition to the chemical composition of the ceramic precursor, the atmosphere in which pyrolysis is conducted (as well as the pyrolysis temperature) also dictates the composition of the ceramic product. Ceramic materials which may be obtained by the present method include, inter alia, silica, silicon carbide, silicon nitride, silicon oxynitride, and metal silicates. In a particularly preferred embodiment, silica is prepared in substantially pure form.

Silica will be provided by pyrolysis of a ceramic precursor containing Si and O in oxygen or in an oxygen-containing atmosphere. Carbon-free polysiloxanes which may be prepared according to the method disclosed herein will provide silica of very high purity, i.e., 95–99% or higher.

The ceramic precursors prepared according to the methods described in Section B may also be pyrolyzed to give silicon nitride, silicon oxynitride, silicon carbide, and metal silicates, as described above and as outlined in Table 1.

Procedurally, pyrolysis is preferably carried out as follows. A ceramic precursor prepared as described in Section B is heated in the selected atmosphere at a predetermined heating rate. If it is desired that the composition of the pyrolysis product correspond substantially to the composition of the precursor, pyrolysis should be carried out in an inert atmosphere. If desired, pyrolysis may be carried out in a reactive atmosphere, e.g., under O$_2$, NH$_3$, H$_2$O$_2$, H$_2$O, N$_2$O, H$_2$, an alkylamine or the like. Pyrolysis in a reactive amine atmosphere (i.e., under ammonia or an alkylamine gas) will typically give more nitrogen in the ceramic product, e.g., in the form of silicon nitride or silicon oxynitride. Preferred heating rates for bulk pyrolysis are in the range of about 0.1° C. to 10° C. per minute, preferably about 0.5° C. to 2° C. per minute, with a particularly effective heating rate, optimizing ceramic yield, of about 0.5° C. per minute. In some applications, flash pyrolysis may be preferred (e.g., in coating applications).

Pyrolysis is carried out at temperatures of at least about 450° C., preferably at temperatures in the range of about 450° C. to about 900° C. The pyrolysis products set forth in Table 1 represent the ceramic materials obtained by pyrolyzing in this temperature range. In some cases, it may be desirable either to initially pyrolyze at a higher temperature, e.g., 1200° C. or higher, or to carry out an additional high temperature pyrolysis step (again, at greater than about 1200° C.) after the initial, 450° C.–900° C., pyrolysis. Such a procedure is useful to remove residual carbon, and in carborizing or crystallizing the product. Where mixtures of silicious ceramic products (e.g., silica, silicon oxynitride) and carbon are obtained upon pyrolysis in the 450° C. to 900° C. range, a subsequent high temperature pyrolysis step will give silicon carbide in high yield. Silicon carbide will also be obtained in fairly high yield upon initial high temperature pyrolysis of the carbon containing ceramic precursors disclosed hereinabove.

The heating process may include one or more isothermal holding steps, in order to control the pyrolysis, to provide more crosslinking at moderate temperatures (less than about 400° C.) and to further increase the yield of the final product.

After pyrolysis at a relatively low temperature, i.e., in the range of 450° C. to 900° C., a high temperature pyrolysis step may be carried out to convert mixtures of silica and carbon to silicon carbide or to crystallize an amorphous ceramic product. Mixtures of silica and carbon are obtained, for example, by low temperature pyrolysis of the precursors of Section B.1. and B.2. If desired, pyrolysis may be carried out in the presence of a catalyst; examples of suitable catalysts are set forth in Tables 2 and 3.

Optionally, pyrolysis may be carried out only partially, i.e., in applications where it is not necessary to obtain a fully pyrolyzed material. Such "partial pyrolysis" or partial curing may be carried out at temperatures lower than 450° C.

D. Ceramic Coatings.

The ceramic materials provided herein are useful in a number of applications, including as coatings for many different kinds of substrates.

Silica, silicon nitride and silicon carbide coatings may be provided on a substrate, for example, by a variation of the pyrolysis method just described. A substrate selected such that it will withstand the high temperatures of pyrolysis (e.g., metal, glass, ceramic, fibers, graphite) is coated with the preceramic gel material. The ceramic precursor is then pyrolyzed on the substrate by heating according to the pyrolysis procedure outlined above. In such a method, pyrolysis can be conducted relatively slowly, i.e., at a heating rate between about 0.1° C. and 10.0° C. per minute, in order to allow evolved gas to escape gradually, and can include one or more isothermal holding steps. In some instances, for example, with relatively temperature-sensitive materials, or where a rapid-coating process is desired, a flash pyrolysis step may be preferred. Flash pyrolysis involves either direct exposure of a coated substrate to a high temperature, or application of the coating material to the surface of a heated substrate. Repeated, multiple coatings may be applied where a thicker layer of material is desired, with partial curing or gradual or flash pyrolysis following each individual coating step.

The pyrolysis temperature will vary with the type of coating desired. Typically, temperatures will range from about 450° C. to about 1100° C. Lower temperatures, below about 450° C., can result in only partially pyrolyzed polymer.

The above coating procedure is a substantial improvement over the conventional, chemical vapor deposition (CVD) method of producing silicious coatings in which the appropriate compounds (e.g., $SiH_4$ and $NH_3$ or volatile silazane) react in the vapor phase to form the ceramic which deposits on the target substrate. CVD is typically a time-consuming process which requires costly and specialized equipment that is limited in size. The procedure described above for producing coatings containing silica, silicon nitride, silicon oxynitride, and/or silicon carbide can be done with a conventional furnace. Further, the method leads to heat-stable, wear-, erosion-, abrasion-, and corrosion-resistant silicious ceramic coatings. Because these silicon-containing coatings have desirable electronic and optical properties, and are resistant to most chemicals as well as to extremes of temperature, many applications of the coating process are possible. One specific application is in gas turbine engines, on parts which are particularly susceptible to wear, corrosion, or heat. Also, the coating process could be used to make the dielectric material of capacitors, or for providing insulating coatings in the electronics industry. Other applications are clearly possible.

E. Fabrication of Molded Ceramic Bodies

The ceramic precursors prepared as described hereinabove may also be used to form three-dimensional articles by injection- or compression-molding using procedures substantially as described in co-pending application Ser. No. 012,874, previously incorporated by reference. The results as demonstrated in the examples of those applications indicate that the procedure may also be successful in the absence of sintering agents.

F. Preparation of Fibers

The ceramic precursors can also be used for preceramic fiber spinning.

Three general spinning techniques are commonly used: (a) melt spinning, in which the polymer is spun from its melt and solidified by cooling; (b) dry spinning, in which the polymer is at least partially dissolved in solution and pulled out through the spinneret into a heat chamber, then solidified by solvent evaporation; and (c) wet spinning, in which a concentrated polymer solution is spun into a coagulation or regeneration bath containing another solvent in which the polymer is not soluble. In addition, gel-type polymers can be spun from very viscous solutions. These tractable polymers rapidly gel and crosslink upon removal of solvent after spinning due to high latent reactivity. Polymeric fibers so formed are intractable.

Additional, relatively small quantities (0.1–5.0 wt. %) of a very high molecular weight substantially linear organic polymer (100,000–5,000,000D) may be mixed with the inorganic polymer to support and improve the fiber strength after spinning, as taught in, e.g., U.S. Pat. No. 3,853,567 to Verbeek and U.S. Pat. No. 3,892,583 to Winter et al.

The supporting technique is especially useful when low molecular weight and/or nonlinear polymers having a very low degree of chain entanglement are used.

One problem encountered in ceramic fiber fabrication derives from the fusability of inorganic polymers during pyrolysis. This fusability results in structural problems in the spun fiber. Polymers produced by the present invention, however, may overcome the fusability problem, providing that the catalytic process as described herein is actually incorporated into the fiber-spinning process. For example, a high molecular weight polysiloxane may be mixed with a homogeneous catalyst and heated in a spinneret or in a curing chamber to cause Si—H bond activation to occur and increase the degree of crosslinking in the fiber. Alternatively, the spinneret can itself be a catalytic bed. Coupling or crosslinking agents may also be included in the fiber-spinning process. Latent reactive groups (e.g., free amino moieties) may be present as well.

G. Other Applications: Preparing Composites, Coatings and the Like Using Metal and/or Ceramic Powders Many other applications of the novel polymers are clearly possible.

Combining the polysiloxanes prepared as described hereinabove, and/or other siloxane or silicon-containing polymers (such as those described in U.S. Pat. Nos. 4,952,715, 5,008,422 and 5,128,494) with a metal powder, a ceramic powder, or both, may be carried out in order to produce composite materials, monolithic materials, ceramic coatings and other end products.

One important application involves combining the ceramic precursors or the gels produced therefrom, as described in Section B, with a metal source such as a metal powder or a mixture of metal powders, prior to curing and pyrolysis. The metal is preferably one that undergoes complete or partial oxidation during the pyrolysis process, i.e., when the polymer/powder admixture is subjected to pyrolytic temperatures in an atmosphere which contains an oxygen donor; the metal may also chemically interact with the polymer, with the polymer-derived material, or with other materials which are present. Examples of metals which may be used include, but are not limited to, aluminum, barium, boron, calcium, copper, hafnium, iron, magnesium, molybdenum, niobium, silicon, titanium, tungsten, yttrium and zirconium.

Depending on the application, the particle size of the metal powder is preferably in the range of approximately 0.01 to 100 μm, more preferably in the range of approximately 0.1 to 20 μm, and most preferably in the range of approximately 0.1 to 10 μm. Various particle shapes may be used, e.g., spherical particles, randomly shaped particles, whiskers or platelets. The term "powder" is intended to encompass all such particle shapes.

Another key application involves combining the precursors prepared as described in Section B with a ceramic powder or ceramic particulates, or with a mixture thereof, prior to fabrication. Suitable ceramic powders include, for example, silicates, titania, zirconia, silicon nitride, silicon carbide, silicon oxynitride, titanium carbide, borates, borides, silicides, aluminates, and clay minerals. The size of the ceramic particles is preferably in the range of approximately 0.005 to 100 μm, more preferably in the range of approximately 0.01 to 20 μm, and most preferably in the range of approximately 0.1 to 20 μm. As with the metal powder, different types of particle shapes may be used, e.g., spherical particles, randomly shaped particles, whiskers or platelets.

This procedure may be carried out by admixing or milling ceramic powder or ceramic particulates (e.g., whiskers, platelets or the like) with the metal powder as well. This is frequently desired in order to balance shrinkage and expansion upon pyrolysis and densification, to promote oxidation of the metal, to reinforce the ceramic product, and/or to provide a ceramic material which may be functionalized after preparation.

Generally, the aforementioned process is carried out by admixing the hydridosiloxane polymer described in part B, or a polysiloxane preceramic material obtained by reaction of such a polymer with a reactant capable of modifying, polymerizing or crosslinking hydridosiloxanes, as described in Sections B.2 through B.7, with an amount of a metal powder and/or ceramic powder selected to provide the final ceramic material with the desired stoichiometry. Other polymeric starting materials may be used as well, generally any silicon-containing polymers that form ceramic materials upon pyrolysis, e.g., silazanes, carbosilanes, polysilanes, siloxanes (including phenyl- or carborane-containing siloxanes), siloxazanes, silsesquioxanes, MQ resins (silylated silicate resins), and the like. Examples of such other polymers which may be used in conjunction with this technique are those which are described in detail in applicants' commonly assigned U.S. Pat. Nos. 4,952,715 and 5,008,422.

It will in most cases be necessary to use a solvent to ensure complete mixing of components. The solvent will preferably be one that is nontoxic and will not react with the metal and/or ceramic powder, or the polymeric starting material (although in some cases the solvent may react with and/or crosslink the polymer); the choice of solvent will also depend on polymer solubility and the ability to produce a stable suspension of metal and/or ceramic powders. Additives which promote formation of emulsions may be used as well; this is particularly preferred when the polymeric starting material exists in liquid form at the outset.

The mixture may be used to prepare coatings, matrices for composite materials, or monolithic ceramic structures.

For coatings, the procedures of Section D may generally be followed. A slurry of metal and/or ceramic powder, polymer and solvent is prepared, optionally containing ceramic powder as well. The solid material in the slurry will typically contain on the order of about 40–90 wt. % powder and 10–60 wt. % polymer. The slurry is used to coat a selected substrate (e.g., metal, glass, ceramic, or the like); the coating may be applied by painting, dipping, spraying or the like.

For monolithic structures, a mixture of polymer, metal and/or ceramic powder is provided that is either in the form of a solid composition or in a formulation that will become solid after injection molding. As with coatings, the mixture may in some cases include a solvent. Preparation of monolithic ceramic structures is generally effected by injection molding, compression molding, extrusion, or using a cold isostatic press technique.

For composite matrices, lower viscosity slurries are preferred. A network of ceramic fibers, bonded fibrils, whiskers or porous ceramics or, alternatively, a "2D" or "3D" fabric structure is provided; these open networks are then drawn through the slurry of powder and polymer so that infiltration of the network is caused to occur. Alternatively, the slurry can be introduced by infiltration or transfer molding techniques, either under pressure or under vacuum conditions. Such a procedure will compensate for any lack of infiltration of the metal powder in the matrix.

Prior to pyrolysis, it is generally necessary to cure the preceramic material, either prior to or after addition of the powder. Curing will generally be conducted at a temperature in the range of about 20° C. to about 250° C., using a photocuring technique, radical activation, dehydrocoupling, hydrosilylation, or other crosslinking techniques. In the latter case, suitable crosslinking agents include any bifunctional or multifunctional chemical compound, i.e., those having reactive sites such as hydroxyl moieties, amino groups, vinyl groups or the like. Preferred crosslinking agents are "coupling agents" for hydridosiloxanes ("H—Z—H"-type agents as defined hereinabove).

Pyrolysis of the preceramic coating, monolithic or infiltrated matrix is then conducted using procedures which are substantially the same as described in Section C, using temperatures which are generally although not necessarily in the range of approximately 300° C. to 900° C., more typically in the range of approximately 450° C. to 900° C., and most typically in the range of approximately 500° C. to 900° C. It may then be necessary to follow pyrolysis with higher temperature crystallization and sintering steps to give rise to desired solid state interactions as well as to ensure ceramic phase development, microstructure development, and complete conversion of metal powder to ceramic material. Sintering is generally conducted using temperatures of at least about 1500° C., typically in the range of about 1500° C. to 2000° C., more typically in the range of about 1500° C. to 1800° C.

Both pyrolysis and sintering may be conducted in an atmosphere which contains an oxygen donor, e.g., oxygen or water, although these heat treatment procedures may also be conducted in a nonoxidative environment, i.e., under an inert atmosphere such as nitrogen, argon or the like. In some cases, lower temperature pyrolysis without subsequent sintering is preferred (generally at temperatures in the range of 150° C. to 1000° C., preferably in the range of 300° C. to 700° C., depending on the metal), such that the metal and/or ceramic powder either remains unoxidized or oxidizes only partially, with the ceramic phase developing from the polymer and any added ceramic particulate material. In this way, other types of metal-ceramic composite materials can be developed with tailored electronic, thermal, structural or other functional properties.

In a variation on the process, it is a precursor to the polymeric siloxane material that is combined with the metal and/or ceramic powder rather than the polymer itself, such that polymerization of the precursor is conducted in situ in the presence of the powder. The precursor is preferably cured prior to or after addition of the powder, as described above.

The aforementioned procedures are useful to prepare high-strength metal-containing ceramic materials in a manner which enables adjustment of the viscosity of the intermediate processing solution or slurry as well as adjustment of the composition and shrinkage of the final product. The stoichiometry of the final ceramic material may also be altered by incorporation of soluble metal-containing compounds in the polymer/powder slurry, e.g., metal alkoxides such as aluminum and titanium alkoxides, organometallic compounds and complexes, and metal salts.

One important application of this technique is in the preparation of mullite, $3Al_2O_3 \cdot 2SiO_2$. Mullite is a high-strength, creep-resistant material with good thermal shock resistance and good dielectric properties (Aksay et al., "Mullite for Structural, Electronic and Optical Applications," *J. Am. Chem. Soc.* 74(10):2343–58 (1990)), and which is useful as both a structural and a functional ceramic. For example, mullite has been used for high temperature structural components, as a matrix material for composites, for electronic substrates and packaging, and infrared windows. As noted earlier herein, however, the presently known techniques for preparing mullite tend to be time-consuming and involve a large number of steps. Additionally, the known techniques tend to involve shrinkage during sintering or are problematic at the shape-forming stage. As illustrated in Example 7, the present technique is by contrast quite simple and straightforward, and results in a high-density mullite in which little or no shrinkage has occurred during fabrication and pyrolysis.

EXAMPLES

Experimental:

The practice of the present invention will employ, unless otherwise indicated, conventional techniques of organic chemistry, polymer chemistry, and the like, which are within the skill of the art. Such techniques are explained fully in the literature. All patents, patent applications, and publications mentioned herein, both supra and infra, are hereby incorporated by reference.

It is to be understood that while the invention has been described in conjunction with the preferred specific embodiments thereof, that the description above as well as the examples which follow are intended to illustrate and not limit the scope of the invention. Other aspects, advantages and modifications within the scope of the invention will be apparent to those skilled in the art to which the invention pertains.

In the following examples, efforts have been made to insure accuracy with respect to numbers used (e.g., amounts, temperature, etc.) but some experimental error and deviation should be accounted for. Unless indicated otherwise, temperature is in degrees C and pressure is at or near atmospheric. All solvents were purchased as HPLC grade, and all reactions were routinely conducted under an inert atmosphere of argon unless otherwise indicated. NMR analyses were conducted on either a Varian XL-400 or a JEOL FX90Q and were referenced to chloroform at δ7.27. FTIR spectra were recorded on a Perkin-Elmer 1610.

Unless otherwise indicated, the reagents used were obtained from the following sources: silanes, from Petrarch Systems, Inc., Bristol, Pa.; organic reagents including amines, from Aldrich Chemical Co., Milwaukee, Wis.; gases, from Matheson, Seacaucus, N.J.; and catalysts, from Strem, Newburyport, Mass.

Example 1

Reactions of Oligo and Polymethylsiloxane with Ammonia a. 0.05 mmol (32 mg) $Ru_3(CO)_{12}$ was added to 100 mmol (6.0 g) $[CH_3SiHO]_4$ and the solution was heated at 60° C. under 200-psi of ammonia. Gas evolution gave a pressure of 400 psi in 19 hours and hard rubber was formed. The product's elemental analysis showed the presence of 5.55% N which indicated a nitrogen-silicon ratio of 0.28 (Table 3). The ratio of oxygen to silicon was found to be about 1.29. Some of the oxygen excess was believed to be a result of oxygen contamination found in the commercial starting material and detected by an NMR intensity ratio of Si—H/Si—$CH_3$ absorbance (0.8:1.0).

The product was pyrolyzed at 850° C. under and atmosphere first, of nitrogen and then, of ammonia. Elemental analysis of the pyrolyzed material suggested a mixture of the following ceramic components (mol ratio): $SiO_2(0.63)$; $Si_3N_4(0.23)$; $SiC(0.14)$; $C(0.58)$. It is not clear whether the N content derived from silicon nitride or from silicon oxynitride. The mol ratios of O, N and Si in the ceramic material were similar to those of the preceramic polymer, i.e., prior to pyrolysis. Pyrolysis under a slow stream of ammonia reduced, almost totally, the carbon content, as well as reducing some of the oxygen excess. Correlatively, pyrolysis under ammonia increased significantly the nitrogen content.

Very similar results were observed when the cyclotetramer was replaced by polymethylsiloxane having a number average molecular weight ($M_n$) of 1880D (degree of polymerization is 29) as shown in Tables 4 and 5. A comparison of the cyclo- and polysiloxane reactions reveals that less nitrogen interacts with the polymer than with the cyclomer, and that the SiC fraction in the product obtained by pyrolysis under nitrogen is higher for the polymer reaction. However, no real difference was seen when both were pyrolyzed under ammonia. The ceramic yields were found to be very high for all types of reactions and pyrolysis procedures. (see Table 4).

b. A solution of 100 mmol (6.0 g) $[CH_3SiHO]_4$ and 25.0 mmol (8 mg) $Ru_3(CO)_{12}$ was heated at 60° C. under 100 psi of ammonia. After 2 hours 220 psi of pressure were formed, and the product was a viscous liquid having $M_n$=1230 D. The pressure was released and the reaction mixture was recharged with additional 100 psi of ammonia. 200 psi of gas were evolved in a 2-hour period, and the viscous liquid converted to a soft rubber.

$^1$H-NMR integration revealed that 41% of the Si—H bonds were replaced by ammonia to form Si—$NH_2$ and Si—NH groups.

Elemental analysis showed the incorporation ratio of 0.24 nitrogen per carbon atom, which indicated the formation of cyclosiloxane chain polymer bridged by ammonia.

Indeed, a dimer of two cyclotetramers bridged by a single —NH was the major product found by GC-MS analysis.

IR of $CCl_4$ solutions showed new sharp stretch peaks at 3421 (w), 3380 (m), $cm^{-1}$ together with new shoulders at 1240 and 1160 $cm^{-1}$.

$^1$H NMR ($CDCl_3$, δ, Ref $CHCl_3$: Si—H (4.69, 0.59H), NH (1.10, 0.16H) $CH_3$ (0.22, 3H).

The elemental analysis of the product was as follows: C, 19.91 (mol ratio 1.00); H, 6.14 (mol ratio 3.70); N, 5.39 (mol ratio 0.24); S, 42.23 (mol ratio 0.91).

TABLE 4

The Elemental Analysis of Polymers and Ceramics Obtained in a Catalyzed Reaction Between Methylsiloxanes and Ammonia

| Product | Analysis % (mol ratio) | | | | |
|---|---|---|---|---|---|
| | Si | O | N | C | H |
| Cyclotetramer reaction | | | | | |
| Polymer | 40.70 | 29.85 | 5.55 | 18.02 | 5.88 |
| | (1.00) | (1.29) | (0.28) | (1.03) | (4.06) |
| Ceramic material under $N_2$ | 45.73 | 32.53 | 6.94 | 14.10 | 0.79 |
| | (1.00) | (1.25) | (0.31) | (0.72) | (0.48) |
| Ceramic material under $NH_3$ | 47.76 | 28.26 | 21.81 | 1.35 | 0.57 |
| | (1.00) | (1.04) | (0.91) | (0.06) | (0.33) |
| Polymer Reaction | | | | | |
| Polymer | 42.47 | 27.80 | 4.06 | 19.67 | 6.00 |
| | (1.00) | (1.14) | (0.19) | (1.07) | (3.95) |
| Ceramic material under $N_2$ | 48.12 | 32.81 | 5.02 | 13.65 | 0.76 |
| | (1.00) | (1.19) | (0.21) | (0.66) | (0.44) |
| Ceramic material under $NH_3$ | 49.29 | 28.35 | 21.01 | 1.75 | 0.54 |
| | (1.00) | (1.03) | (0.87) | (0.09) | (0.31) |

TABLE 5

Ceramic Yield of the Pyrolyzed Polymers Obtained in a Catalytic Reaction Between Methylsiloxanes and Ammonia

| Reactant | Pyrolysis Conditions | Ceramic Yield (%) |
|---|---|---|
| Cyclotetramer | $N_2$ | 77 |
| Cyclotetramer | $NH_3$ | 84 |
| Polymer | $N_2$ | 75 |
| Polymer | $NH_3$ | 88 |

Evidence for $Si_2ON_2$: X-ray powder diffraction analyses of the ceramic products obtained by the above procedure showed clear spectra pattern of orthorhombic $Si_2ON_2$, when the polymeric products were pyrolyzed under $NH_3$. Pyrolysis under $N_2$ gave poor crystallization under the same conditions. When the amorphous ceramic product produced by pyrolysis under $N_2$ at 900° C. was reheated to 1600° C. (also under $N_2$), however, X-ray powder diffraction analysis of the product again indicated orthorhombic $Si_2ON_2$. No other types of ceramic crystallites were observed in the X-ray powder diffraction spectra.

Example 2

Reactions of Methylsiloxanes $[CH_3SiHO]_x$ With Dimethylamine a. $[CH_3SiHO]_4$: To 6.0 g (100 mmol) $[CH_3SiHO]_4$ were added 32 mg (0.05 mmol) of $Ru_3(CO)_{12}$ and the solution was charged with approximately 100 psi of dimethylamine. The reaction was carried out at 60° C. and detected by the observed pressure formed in the reactor. The pressure was released every 0.5–1 hour and the reactor recharged with fresh dimethylamine. After 6 hours, a total pressure of 1100 psi was charged into the reactor and a total pressure of 770 psi was formed. No more gas evolution was observed. 8.1 g of viscous oily products were obtained, indicating a 49% yield of amine substitution. This yield correlated with the $^1$H-NMR analysis of the solution, which showed 53% amine substitution and 29% Si—H groups. GC-MS analysis showed that bis- and tris-substituted cyclotetramers were the major products when mono and tetrakis appear only in small quantities.

b. $[CH_3SiHO]_{31}$: The reaction was run with the same amounts and under the same conditions as the reaction with the tetramer. Only 50 psi of dimethylamine could be charged into the reactor each time. A total pressure of 500 psi was charged and 375 psi of gas evolved after 6 hours. 7.4 g of a very viscous polymer was obtained (33% yield of amine substitution) which is correlated to the $^1$H-NMR analysis showing similar results (36% amine substitution and 45% Si—$CH_3$ groups).

Example 3

Reactions of Methylsiloxanes $[CH_3SiHO]_x$ a. $[CH_3SiHO]_4$: To 6.0 g (100 mmol) $[CH_3SiHO]_4$ were added 0.40 g water and $Ru_3(CO)_{12}$ as above. The reaction was carried out at 60° C. under nitrogen and detected by the observed hydrogen pressure formed in the reactor. After ½ hour, a total pressure of 440 psi was formed. After 2 hour, a total pressure of 520 psi was observed. No more gas evolution was observed. Pyrolysis was carried out at a rate of 5° C./min up to 900° C. Pyrolysis under nitrogen gave a 70% yield, while pyrolysis under ammonia gave a 77.3% yield. Elemental analysis of the product before pyrolysis gave the following: C, 19.91 (mol ratio 1.03); H, 5.67 (mol ratio 3.81); N, 0.10; Si, 41.63 (mol ratio 1.00); O, 22.16 (mol ratio 0.93). Elemental analysis of the product after pyrolysis under nitrogen gave: C, 12.66 (mol ratio 0.65); H, 0.98 (mol ratio 0.60); N, 0.74 (mol ratio 0.03); Si, 45.74 (mol ratio 1.00); O, 40.27 (mol ratio 1.54). The mole ratio of $SiO_2$:SiC:C was derived to be approximately 0.77:0.23:0.42.

b. $[CH_3SiHO]_{29}$: To 6.0 g (100 mmol) $[CH_3SiHO]_4$ were added 0.18 g water and $Ru_3(CO)_{12}$ as above. The reaction was carried out at 60° C. under nitrogen and, as in Section (a), detected by the observed pressure formed in the reactor. After ½ hour, a total pressure of 150 psi was formed. After 2 hour, a total pressure of 180 psi was observed. No more gas evolution was observed. Pyrolysis was carried out at 900° C. Pyrolysis under nitrogen gave a 44% yield, while pyrolysis under ammonia gave a 86.7% yield. Elemental analysis of the product before pyrolysis gave the following: C, 20.69 (mol ratio 1.13); H, 6.70 (mol ratio 4.41); N, 0.24; Si, 42.78 (mol ratio 1.00); O, 26.81 (mol ratio 1.07). Elemental analysis of the product after pyrolysis under nitrogen gave: C, 12.73 (mol ratio 1.06); H, 0.82 (mol ratio 0.82); N, 0.80 (mol ratio 0.06); Si, 45.53 (mol ratio 1.63); O, 40.41 (mol ratio 2.52).

c. To 10 grams of cyclotetrahydridomethylsiloxane ($CH_3SiHO)_4$, in 20 g tetrahydrofuran (THF) were added 0.67 g $H_2O$ and 20 mg $Ru_3(CO)_{12}$, and the solution was heated to 60° C. under nitrogen. The reaction was followed by observing the total pressure in the reactor. After 15 minutes, the total pressure observed was 280 psi; after 3 hours, the increase in pressure stopped and the evolution of gas ($H_2$, as above) was thus completed. After removal of solvent, a viscous, waxy polymer, polycyclohydridomethylsiloxane (PHMSO) was obtained, removed from the reactor, and diluted to give a 5 wt. % solution. The polymer slowly continued to crosslink and converted to a solid product which was still soluble in THF. The resulting polymer can be pyrolyzed under nitrogen or oxygen to give a high yield of an amorphous ceramic composition comprising silica and potentially carbon, and is useful in the fabrication of ceramic coatings, shaped products, fibers, films, and the like.

Example 4

Reactions of Diethylsilane with Water a. To 0.88 g diethylsilane were added 0.18 g $H_2O$ and 50 mg triethylamine as catalyst. The reaction was carried out under nitrogen at 60° C. and detected by the observed pressure formed in the reactor. After 1 hour, a total pressure of 5 psi was observed. After 22 hours, 78% of the diethylsilane was converted to linear and cyclic oligomers of $[Et_2SiO]_n$ (Et=ethyl), wherein n is 2–9.

b. To 1.76 g diethylsilane were added 0.36 g water and 16 mg $Ru_3(CO)_{12}$ as catalyst. The reaction was carried out under nitrogen at 60° C. and detected by the observed pressure in the reactor. After 1 hour, a total pressure of 150 psi was observed; a pressure of 150 psi remained after 3 hours. 1.75 g product was obtained. After 1 hour, a series of Example 5

As described in Section B.2., it will sometimes be desired to introduce additional carbon into the preceramic polysiloxane so that a higher fraction of carbon will be present in the ceramic product, e.g., as follows.

a. Reaction of $[CH_3SiHO]_4$ with an alkene or alkyne: To $[CH_3SiHO]_4$ in a suitable solvent such as THF is added a predetermined amount of the selected alkene or alkyne. The amount will vary depending on the mole fraction of carbon desired in the ultimate ceramic product. A catalyst such as $H_2PtCl_6$ is added, and the solution is heated to about 60° C. under an inert atmosphere such as nitrogen. The resulting hydro silylation product, in which hydrogen atoms of activated Si—H bonds have been replaced by carbon-containing groups, may or may not be isolated at this point. Hydrolysis is then carried out to polymerize this product, according to the method of the preceding examples. Water is added, along with a catalyst, and the reaction is carried out at about 60° C. under nitrogen. As in the preceding examples, the reaction is monitored by observing the increase in pressure during the reaction. When the pressure increase stops, the reaction may be presumed to be complete. Pyrolysis of the resulting polymer will give a product which contains a relatively high fraction of carbon, as either silicon carbide or unbound carbon. To increase the fraction of silicon carbide in the ceramic product, an additional 1200° C. pyrolysis step may be carried out. This procedure is useful for making ceramic articles, coatings, and the like, having a high carbon content.

b. In an alternative procedure, $[CH_3SiHO]_4$ may be hydrolyzed to give a polysiloxane as described in Example 3, followed by reaction with an alkene or alkyne to give substantially the same preceramic polymer as obtained in the Section (a). The catalyst may or may not be the same as that used in Section (a).

c. Aryl groups may also be introduced into the polymer using this method. For example, $[CH_3SiHO]_4$ may be reacted with styrene using essentially the same procedure as described in Section (a), to introduce pendant aromatic groups into the polysiloxane precursor. Alternatively, $[CH_3SiHO]_4$ may first be reacted with water, followed by reaction of the resulting polymer with styrene, along the lines of the procedure outlined in Section (b). In either case, the ceramic precursor produced will have a higher carbon content than that of the hydridosiloxane starting material, in turn giving rise to a ceramic product of higher carbon content (aryl groups are readily transformed to give graphite carbon).

Example 6

Ceramic products comprised of metal silicates may be prepared by reacting a hydridosiloxane starting material with a metal-containing compound, as follows.

a. Reaction of PHMSO with CpFeCp-OH: To PHMSO in a suitable solvent such as THF is added a predetermined amount of aluminum bis(glycolate). The amount will vary depending on the mole fraction of iron desired in the ultimate ceramic product. A catalyst such as $Ru_3(CO)_{12}$ is added, and the solution is heated to about 60° C. under an inert atmosphere such as nitrogen. The resulting product, in which Si—H groups have been replaced by

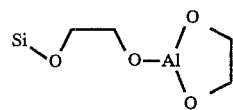

groups, may or may not be isolated at this point. Pyrolysis of the resulting polymer will give an iron silicate ceramic product, i.e., one which contains silicon, iron and oxygen.

b. In an alternative procedure, a linear polyhydridosiloxane starting material is subjected to hydrolysis in dilute solution to form Si—OH species. The product is then reacted with $Ti(OR)_4$ or $(RO)_xTiCl_{4-x}$ to form Si—O—Ti groups.

c. The aforementioned procedures may also be used to prepare "SiAlON," a ceramic product containing aluminum, i.e., in addition to silicon, oxygen and nitrogen. The method of Sections (a) or (b) are followed using an aluminum-containing reactant such as $[RAlNH]_3$, $(RO)_3Al$ or $[RAlO]_3$ instead of aluminum bis(glycolate), with pyrolysis carried out under ammonia.

Example 7

This example describes several procedures used to make mullite.

(a.) 23.4 g (0.3 mol) $Al(OH)_3$ (Alfa) mixed with 200 g hexane. After 0.5 hr of stirring, the mixture was treated in an ultrasonic bath for 0.5 hr. No suspension was observed. 6 g of polyhydridomethylsiloxane (Hüls America) were added to the mixture, generating a suspension immediately. No aggregates were observed. The mixture was then ultrasonically treated for 0.5 hr, and 3 mg of $Ru_3(CO)_{12}$ dissolved in 10 ml dichloromethane were added. The mixture was then placed in an ultrasonic bath for 0.5 hr, followed by removal of solvents using rotary evaporation. The remaining material was pyrolyzed by first heating to a temperature of 900° C., and then heating to 1500° C., at a rate of 5° C./min with a dwell period of 2 hr at 1500° C. 94% remained after this heat treatment. Total weight loss up to 1500° C. was 29.5%

900° C.: Elemental analysis of the pyrolyzed material revealed the following proportion of components in the composition after pyrolysis at 900° C.: $Al_{3.95}Si_1O_{3.85}H_{1.34}$.

There was an excess of $Al_2O_3$ in a ratio of 0.95:1 relative to mullite (16.5 wt % of total). The presence of hydrogen suggested incomplete dehydration or water absorption. The same conclusion could be drawn from the presence of excess oxygen. Since the excess oxygen was present in a 1:2 molar ratio relative to the excess hydrogen, it was presumed that adsorbed water was present. Carbon was almost completely eliminated.

1500° C.: Very similar results were obtained; additional elimination of water was observed. Elemental analysis of the pyrolyzed material revealed the following proportion of components in the composition: $Al_{4.09}Si_1O_{8.78}$.

(b.) 19.4 g of the decomposed $Al(OH)_3$ were mixed with 200 g hexane. After 0.5 hr in an ultrasonic bath the powder tended to precipitate, rapidly forming agglomerates. 6 g of polyhydridomethylsiloxane were added and ultrasonically mixed for 0.5 hr. 3 mg of $Ru_3(CO)_{12}$ (Strem) dissolved in 5 g $CH_2Cl_2$ were added and mixed by shaking. After the addition of polyhydridomethylsiloxane the mixture formed a semi-stable slurry which did not separate rapidly. Solvent was removed via rotary evaporation, and pyrolysis was conducted as in part (a.).

(c.) The following procedure was carried out in a dry box to prevent the ignition of the Al powder. To 4.5 g fine Al powder (Cerac, Inc.) were added 870 g cyclohexane. 3 g of polyhydridomethylsiloxane were added and well mixed by shaking. Then 3 mg of $Ru_3(CO)_{12}$ already dissolved in 5 g $CH_2Cl_2$ were added. After 0.5 hr in an ultrasonic bath, solvent was evaporated by oil pump vacuum while stirring the mixture. The mixture was a runny paste. A portion was carefully pyrolyzed according to the following schedule: 0°–100° C., 5° C./min, dwell 1 hr; 100°–200°, 5° C./min, dwell 1 hr; 200°–850° in increments of 50° C.; 850°–1200°, 5° C./min, dwell 2 hr; and 1200°–1500°, 5° C./min, dwell 2 hr.

Curing of the liquid paste was obtained at 100° C. According to TGA, no weight loss was observed until 550° C. Two steps of weight gain were observed between 550°–650° C. and 800°–1050° C. Above 1100° C. a weight loss was observed.

(d.) 150 g cyclohexane were added to 15.3 g alumina, 6 g of polyhydridomethylsiloxane were added and mixed ultrasonically for 0.5 hr. The slurry was stable after the addition of the polymer. 3 mg of $Ru_3(CO)_{12}$ dissolved in $CH_2Cl_2$ were added and mixed ultrasonically for 10 min. The solvent was removed using rotary evaporation. The powder was pyrolyzed as in part (a.).

(e.) The solvent in slurry of the mullite prepared in part (c.) was completely removed using rotary evaporation. The slurry was mixed with mullite powder (Baikowski) and cyclohexane and stirred. Solvent was then removed using rotary evaporation. The mixture was a soft, semidry powdery paste that can be easily pressed. A portion of the mixture was pressed uniaxially by 10,000 psi. The pressed compounds were heated according to the following schedule:

| Sample | Wt. after pressing | At 900° C. | (wt. % increase) |
|---|---|---|---|
| 1 | 0.767 | 0.880 | (14.7%) |
| 2 | 1.126 | 1.289 | (15.1%) |
| 3 | 1.407 | 1.609 | (14.9%) |

(f.) A new mixture of Al/polyhydridomethylsiloxane/mullite was prepared using 20 µm spherical Al powder (Aldrich). This powder settled immediately in cyclohexane but after adding polyhydridomethylsiloxane a homogeneous mixture was obtained. Initial mixture: Al, 74.84 g; polyhydridomethylsiloxane, 54.76 g; and cyclohexane, 50 g. The solvent was removed using a high vacuum pump. The mixture was a running slurry, 100 g of mullite (Baikowski) were added, along with 100 g cyclohexane. The solvent was removed again. The mixture so obtained was found to be a homogeneous, very viscous slurry. 50 g of mullite were added along with 150 g of cyclohexane; the mixture was shaken vigorously and then dried again. At that point, the mixture was suitable for pressing. 50 g of cyclohexane were added, along with 27 mg of $Ru_3(CO)_{12}$ (Strem) dissolved in 10 g $CH_2Cl_2$. The mixture was vigorously shaken and dried again. After solvent removal the mixture was a dried, pressable homogeneous mixture. However, when treated with mortar and pestle, it transformed into a viscous paste. The treated material could be pressed into pellets and bars.

Example 8

Preparation of Polymer/Powder Mixtures and Pyrolysis Thereof to Ceramic Materials Aluminum powder (1 µm; Cerac) was mixed with cyclohexane to form low viscosity slurries in sealable glass flasks and ultrasonically mixed for 20–30 minutes. Polyhydridomethylsiloxane was added to provide the required stoichiometric amount of silicon and to generate stable, homogeneous slurries. $Ru_3(CO)_{12}$ in a catalytic quantity, dissolved in 1 to 5 ml of $CH_2Cl_2$ (weight ratio of 1:2,000), was added.

The mixture was shaken and ultrasonically mixed again after catalyst addition. At this and later processing stages, the slurries were protected from the atmosphere to minimize initiation of polymer curing by the reaction with water. The solvent was removed by vacuum evaporation using an oil vacuum pump. The slurry was magnetically stirred during solvent removal to maintain homogeneity. Low viscosity aluminum/polymer slurries were then made for coatings. For making ceramic monoliths, mullite powder was added to the slurries to increase viscosity and form powders for pressing.

Powders and polymers were mixed in various ratios as detailed in Table 6. Nominal Al:Si ratios are given in the table. Mixtures were made initially in small quantities (10–30 g) for heat treatment and analysis. Batches of approximately 100 to 200 g were prepared for pressing pellets and bend bar samples.

Powdery mixtures were formed from the slurries either by solvent evaporation or by other drying techniques. With the exception of mixtures containing only polymer and aluminum powder, all the mixtures formed were dry or slightly moist powders. Powders were kept under $N_2$ until pressed. Pressed pellets were exposed to the air to initiate curing. Powders were uniaxially die-pressed at 2,500 to 10,000 psi in 1.25-cm-diameter dies to form pellets and in larger dies to form slabs of ~50 mm×18×6 mm for cutting into bend bars. Some pressed samples were later cold isostatically pressed to 70,000 psi in an effort to overcome delamination on die pressing.

The mullite 20 mixture, which contained approximately 1 μm Al powder, was diluted with toluene and then used to form coatings on various substrates. The slurry was painted onto Al strips, glass laboratory slides, $Al_2O_3$ pieces, and quartz glass. The coated substrates were treated at various temperatures in air from 900° C. up to 1500° C., depending on the thermal capability of the particular substrate.

Heat treatment is necessary to cure the polymer, pyrolyze the polymer to remove volatile components, react the constituents, oxidize, and sinter the material to a dense compact. Powder/polymer mixtures as both powders and pressed pellets were heated in air and later in air/$O_2$. Curing generally takes place at temperatures below 200° C., and pyrolysis at temperatures up to 900° C. to pyrolyze the polymer to a ceramic material. Heat treatments generally involved holding steps to allow for the completion of various pyrolytic stages. Selected powders were heated to various temperatures for subsequent X-ray diffraction analysis to monitor phase development. Pressed pellets were generally sintered at 1650° C. for times of 2 to 10 hours. Some pellets were also sintered at 1450° C.

A typical heat treatment schedule with the rationale for the holds is given in Table 7.

TABLE 6

Composition of Powder/Polymer Mixtures

| Sample | Reactants | Al:Si (Nominal) | Al:Si (Elemental Analysis) |
|---|---|---|---|
| Mullite 1 | $Al(OH)_3$ + HMSO + (H* + R**) | 3 | 3.95 (900° C., $Al_{3.95}Si_1O_{9.84}H_{1.94}$) 4.09 (1500° C., $Al_{4.09}Si_1O_{8.78}$) |
| Mullite 2 | $Al(OH)_3$ + HMSO + (H + R) | 1.5 | 2.09 (900° C., $Al_{2.09}Si_1O_{5.9}$) 1.97 (1500° C., $Al_{1.97}Si_1O_{5.07}$) |
| Mullite 3 | {AlO(OH) + some[$Al(OH)_3$]} + HMSO + (H + R) | 3 | 3.27 (900° C., $Al_{3.27}Si_1O_{8.57}$) 3.60 (1500° C., $Al_{3.60}Si_1O_{6.99}$) |
| Mullite 4 | $Al(OH)_3$ + HMSO + (CH*** + R) | 3 | NA |
| Mullite 5 | {AlO(OH) + some[$Al(OH)_3$]} + HMSO + (CH + R) | 3 | NA |
| Mullite 6 | All powder + HMSO + (CH + R) | 3 | 2.79 (600° C., $Al_{2.79}Si_1O_{4.08}C_{0.27}$) 3.04 (1200° C., $Al_{3.04}Si_1O_{6.28}C_{0.18}$) 3.00 (1500° C., $Al_{3.00}Si_1O_{6.78}C_{0.14}$) |
| Mullite 7 | $\gamma Al_2O_3$ + HMSO + (CH + R) | 3 | 4.33 (900° C., $Al_{4.33}Si_1O_{9.32}$) 4.12 (1500° C., $Al_{4.12}Si_1O_{9.16}$) |
| Mullite 8 | Mullite powder + 15% HMSO | 1.85 | 2.01 (900° C., $Al_{2.01}Si_1O_{5.85}$) 1.90 (1500° C., $Al_{1.90}Si_1O_{4.96}$) |
| Mullite 9 | $Al(OH)_3$ + HMSO + (CH + R) | | NA |
| Mullite 10 | $\gamma$-$Al_2O_3$ + HMSO + (CH + R) | | NA |
| Mullite 11 | [Al(1 μm) + HMSO + (CH + R)] + Mullite powder (39 wt %) (Al powder--35 wt %) | 3 | 2.95 (900° C., $Al_{2.95}Si_1O_{6.64}$) 2.90 (1200° C., $Al_{2.90}Si_1O_{7.12}$) 2.83 (1650° C., $Al_{2.83}Si_1O_{6.70}$) |
| Mullite 20 | Repeat of Mullite 11 | 3 | NA |
| Mullite 21 | $\gamma$-$Al_2O_3$ + HMSO + (CH + R) | 3:1.44 | NA |
| Mullite 22 | Al (20 μm, 27 wt %) + HMSO + Mullite powder (54 wt %) + R | 3 | 3.51 (670° C., $Al_{3.51}Si_1O_{4.00}$) |

*H = hexane.
**R = $Ru_3(CO)_{12}$ (catalyst).
***CH = cyclohexane.

TABLE 7

| Temperature Interval | Heat Treatment Schedule | |
|---|---|---|
| | Ramp Rate: Hold Time | Comment |
| 25° C. → 150° C. | 4° C./min | |
| 150° C. | 4 hours | Polymer curing |
| 150° C. → 550° C. | 4° C./min | Curing/pyrolyis of polymer |
| 550° C. | 8 hours | Pyrolysis |
| 550° C. → 625° C. | 4° C./min | |
| 625° C. | 4 hours | Oxidation of Al metal (for mixtures with Al) |
| 625° C. → 1000° C. | 4° C./min | |
| 1000° C. | 10 hours | Completion of pyrolysis/reaction |
| 1000° C. → 1650° C. | 2° C./min | reaction/sintering |
| 1650° C. | 2 to 10 hours | Sintering |
| 1650° C. → 1450° C. | 10° C./minute | |
| 1450° C. | Power off | |

We claim:

1. A method for preparing a ceramic material, comprising:
   (a) providing a hydridosiloxane starting material containing a plurality of Si—H bonds, and wherein at least about 20% of the silicon atoms in the starting material have a hydrogen atom bound thereto;
   (b) reacting said hydridosiloxane starting material with a hydroxyl-containing compound of the formula R'—OH, wherein R' is (i) hydrogen, (ii) $C_1$–$C_{10}$ alkyl or aryl of 1–2 rings, optionally substituted with hydroxyl, lower alkyl, halogeno, silyl, or amino groups, or combinations thereof, (iii) silyl optionally containing additional hydroxyl groups, or (iv) a metal optionally bound to one or more ligands and/or containing additional hydroxyl groups, to give a ceramic precursor in which hydrogen atoms in the hydridosiloxane starting material have been replaced by oxygen-containing pendant groups OR' or oxygen-containing bridging moieties;
   (c) adding a metal powder, a ceramic powder, or both, either prior to, during, or after step (b),
   wherein a catalyst effective to activate Si—H bonds is added in step (b), step (c) or both,
   such that a preceramic mixture is provided;
   (d) curing the preceramic mixture at a temperature between approximately 20° C. and 250° C., to provide a cured preceramic mixture; and
   (e) pyrolyzing said cured preceramic mixture at a temperature of at least about 500° C. to give said ceramic material.

2. The method of claim 1, wherein curing is conducted using a compound capable of coupling hydridosiloxanes.

3. The method of claim 1, wherein R' is hydrogen or lower alkyl.

4. The method of claim 1, wherein in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

5. The method of claim 4, wherein the metal powder has an average particle size in the range of approximately 0.01 to 100 µm.

6. The method of claim 1, wherein in step (c) said ceramic precursor is admixed with both a metal powder and a ceramic powder.

7. The method of claim 6, wherein said metal powder is comprised of particulate aluminum and said ceramic material is mullite.

8. The method of claim 1, wherein in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

9. The method of claim 3, wherein the metal powder has an average particle size in the range of approximately 0.01 to 100 µm.

10. The method of claim 3, wherein in step (c) said ceramic precursor is admixed with both a metal powder and a ceramic powder.

11. A method for preparing a ceramic material, comprising:
    (a) providing a hydridosiloxane starting material containing a plurality of Si—H bonds, and wherein at least about 20% of the silicon atoms present in the starting material have a hydrogen atom bound thereto;
    (b) introducing carbon-containing moieties into said hydridosiloxane starting material by reaction with a compound containing an unsaturated carbon-carbon bond, to give a ceramic precursor in which hydrogen atoms in the hydridosiloxane starting material have been replaced by pendant or bridging carbon-containing moieties;
    (c) adding a metal powder, a ceramic powder, or both, either prior to, during, or after step (b),
    wherein a catalyst effective to activate Si—H bonds and unsaturated carbon-carbon bonds is added in step (b), step (c) or both,
    such that a preceramic mixture is provided;
    (d) curing the preceramic mixture at a temperature between approximately 20° C. and 250° C., to provide a cured preceramic mixture; and
    (e) pyrolyzing said cured preceramic mixture at a temperature of at least about 500° C. to give said ceramic material.

12. The method of claim 11, wherein in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

13. The method of claim 11, wherein in step (c) said ceramic precursor is admixed with both a metal powder and a ceramic powder.

14. A method for preparing a ceramic material, comprising:
    (a) providing a hydridosiloxane starting material containing a plurality of Si—H bonds, and wherein at least about 20% of the silicon atoms present in the starting material have a hydrogen atom bound thereto;

(b) introducing nitrogen-containing moieties into said starting material by reaction with a compound $HNR''_2$ wherein the R'' are independently selected from hydrogen, lower alkyl, silyl, and aryl of 1–2 rings, to give a ceramic precursor in which hydrogen atoms in the hydridosiloxane polymer have been replaced with nitrogen-containing pendant or crosslinking groups;

(c) adding a metal powder, a ceramic powder, or both, either prior to, during, or after step (b), wherein a catalyst effective to activate Si—H bonds is added in step (b), step (c) or both, such that a preceramic mixture is provided;

(d) curing the preceramic mixture at a temperature between approximately 20° C. and 250° C., to provide a cured preceramic mixture; and (e) pyrolyzing said cured preceramic mixture at a temperature of at least about 500° C. to give said ceramic material.

15. The method of claim 14, wherein in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

16. The method of claim 15, wherein in step (c) said ceramic precursor is admixed with both a metal powder and a ceramic powder.

17. A method for preparing a ceramic material, comprising:

(a) providing a hydridosiloxane starting material containing a plurality of Si—H bonds, and wherein at least about 20% of the silicon atoms present in the starting material have a hydrogen atom bound thereto;

(b) reacting said hydridosiloxane starting material with a compound selected from the group consisting of $ML_a$ and $L_aM$-OH, wherein M is a metal atom, L is an organic or inorganic ligand associated therewith, and a represents the molar ratio L/M, to give a ceramic precursor in which activated Si—H bonds have been replaced by Si—M bonds;

(c) adding a metal powder, a ceramic powder, or both, either prior to, during, or after step (b), wherein a catalyst effective to activate Si—H bonds is added in step (b), step (c) or both, such that a preceramic mixture is provided;

(d) curing the preceramic mixture at a temperature between approximately 20° C. and 250° C., to provide a cured preceramic mixture; and (e) pyrolyzing said cured preceramic mixture at a temperature of at least about 500° C. to give said ceramic material.

18. A method for preparing a ceramic material, comprising:

(a) providing a starting material comprising a silicon-containing polymer having a plurality of Si—H groups;

(b) curing said silicon-containing polymer with light, by dehydrocoupling or by reaction with a coupling agent, to provide a ceramic precursor;

(c) admixing (i) a catalyst effective to activate Si—H bonds, and (ii) a metal powder, with either the silicon-containing polymer, the ceramic precursor, or both; and (d) pyrolyzing the mixture of step (c).

19. The method of any one of claims 1, 11, 14, 17 or 18, wherein, prior to conducting pyrolysis, the preceramic mixture is coated on a substrate, such that the ceramic material is a coating.

20. The method of any one of claims 1, 11, 14, 17 or 18, wherein, prior to conducting pyrolysis, ceramic fibers are incorporated into the preceramic mixture, such that the ceramic material is a fiber-reinforced matrix.

21. A ceramic coating prepared by the process comprising:

(a) providing a hydridosiloxane starting material containing a plurality of Si—H bonds, and wherein at least about 20% of the silicon atoms in the starting material have a hydrogen atom bound thereto;

(b) reacting said hydridosiloxane starting material with a hydroxyl-containing compound of the formula R'—OH, wherein R' is (i) hydrogen, (ii) $C_1$–$C_{10}$ alkyl or aryl of 1–2 rings, optionally substituted with hydroxyl, lower alkyl, halogeno, silyl, or amino groups, or combinations thereof, (iii) silyl optionally containing additional hydroxyl groups, or (iv) a metal optionally bound to one or more ligands and/or containing additional hydroxyl groups, to give a ceramic precursor in which hydrogen atoms in the hydridosiloxane starting material have been replaced by oxygen-containing pendant groups OR' or oxygen-containing bridging moieties;

(c) adding a metal powder, a ceramic powder, or both, either prior to, during, or after step (b), wherein a catalyst effective to activate Si—H bonds is added in step (b), step (c) or both, such that a preceramic mixture is provided;

(d) curing the preceramic mixture at a temperature between approximately 20° C. and 250° C., to provide a cured preceramic mixture; and (e) pyrolyzing the preceramic mixture on a substrate, at a temperature of at least about 500° C., to provide a ceramic coating thereon.

22. The ceramic coating composition of claim 21, wherein the substrate is coated with the preceramic mixture after step (c) and prior to step (d).

23. The ceramic coating composition of claim 21, wherein the substrate is coated with the cured preceramic mixture after step (d).

24. The ceramic coating composition of claim 21, wherein, in the hydroxyl-containing compound, R' is hydrogen or lower alkyl.

25. The ceramic coating composition of 21, wherein, in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

26. A ceramic coating prepared by the process comprising:

(a) providing a hydridosiloxane starting material containing a plurality of Si—H bonds, and wherein at least about 20% of the silicon atoms present in the starting material have a hydrogen atom bound thereto;

(b) introducing carbon-containing moieties into said hydridosiloxane starting material by reaction with a compound containing an unsaturated carbon-carbon bond, to give a ceramic precursor in which hydrogen atoms in the hydridosiloxane starting material have been replaced by pendant or bridging carbon-containing moieties;

(c) adding a metal powder, a ceramic powder, or both, either prior to, during, or after step (b), wherein a catalyst effective to activate Si—H bonds and unsaturated carbon-carbon bonds is added in step (b), step (c) or both, such that a preceramic mixture is provided;

(d) curing the preceramic mixture at a temperature between approximately 20° C. and 250° C., to provide a cured preceramic mixture; and (e) pyrolyzing the preceramic mixture on a substrate, at a temperature of at least about 500° C., to provide a ceramic coating thereon.

27. The ceramic coating composition of claim 26, wherein the substrate is coated with the preceramic mixture after step (c) and prior to step (d).

28. The ceramic coating composition of claim 26, wherein the substrate is coated with the cured preceramic mixture after step (d).

29. The ceramic coating composition of 26, wherein, in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

30. A ceramic coating prepared by the process comprising:

(a) providing a hydridosiloxane starting material containing a plurality of Si—H bonds, and wherein at least about 20% of the silicon atoms present in the starting material have a hydrogen atom bound thereto;

(b) introducing nitrogen-containing moieties into said starting material by reaction with a compound $HNR''_2$ wherein the R" are independently selected from hydrogen, lower alkyl, silyl, and aryl of 1–2 rings, to give a ceramic precursor in which hydrogen atoms in the hydridosiloxane polymer have been replaced with nitrogen-containing pendant or crosslinking groups;

(c) adding a metal powder, a ceramic powder, or both, either prior to, during, or after step (b), wherein a catalyst effective to activate Si—H bonds is added in step (b), step (c) or both, such that a preceramic mixture is provided;

(d) curing the preceramic mixture at a temperature between approximately 20° C. and 250° C., to provide a cured preceramic mixture; and (e) pyrolyzing the preceramic mixture on a substrate, at a temperature of at least about 500° C., to provide a ceramic coating thereon.

31. The ceramic coating composition of claim 30, wherein the substrate is coated with the preceramic mixture after step (c) and prior to step (d).

32. The ceramic coating composition of claim 30, wherein the substrate is coated with the cured preceramic mixture after step (d).

33. The ceramic coating composition of claim 30, wherein, in the compound $HNR''_2$, the R" moieties are independently selected from the group consisting of hydrogen and lower alkyl.

34. The ceramic coating composition of claim 30, wherein, in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

35. A ceramic coating prepared by the process comprising:

(a) providing a hydridosiloxane starting material containing a plurality of Si—H bonds, and wherein at least about 20% of the silicon atoms present in the starting material have a hydrogen atom bound thereto;

(b) reacting said hydridosiloxane starting material with a compound selected from the group consisting of $ML_a$ and $L_aM$-OH, wherein M is a metal atom, L is an organic or inorganic ligand associated therewith, and a represents the molar ratio L/M, to give a ceramic precursor in which Said activated Si—H bonds have been replaced by Si—M bonds;

(c) adding a metal powder, a ceramic powder, or both, either prior to, during, or after step (b), wherein a catalyst effective to activate Si—H bonds is added in step (b), step (c) or both, such that a preceramic mixture is provided;

(d) curing the preceramic mixture at a temperature between approximately 20° C. and 250° C., to provide a cured preceramic mixture; and (e) pyrolyzing the preceramic mixture on a substrate, at a temperature of at least about 500° C., to provide a ceramic coating thereon.

36. The ceramic coating composition of claim 35, wherein the substrate is coated with the proceramic mixture after step (c) and prior to step (d).

37. The ceramic coating composition of claim 35, wherein the substrate is coated with the cured proceramic mixture after step (d).

38. The ceramic coating composition of claim 35, wherein, in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

39. A ceramic coating composition prepared by the process comprising:

(a) providing a starting material comprising a silicon-containing polymer having a plurality of Si—H groups;

(b) curing said silicon-containing polymer with light, by dehydrocoupling or by reaction with a coupling agent, to provide a ceramic precursor;

(c) admixing (i) a catalyst effective to activate Si—H bonds, and (ii) a metal powder, with either the silicon-containing polymer, the ceramic precursor, or both, to provide a preceramic mixture;

(d) coating a substrate with the preceramic mixture, whereby a preceramic coating is provided; and (e) pyrolyzing the preceramic ceramic coating on the substrate, to provide a ceramic coating thereon.

40. A fiber-reinforced ceramic matrix composite prepared by the process comprising:

(a) providing a hydridosiloxane starting material containing a plurality of Si—H bonds, and wherein at least about 20% of the silicon atoms in the starting material have a hydrogen atom bound thereto;

(b) reacting said hydridosiloxane starting material with a hydroxyl-containing compound of the formula R'—OH, wherein R' is (i) hydrogen, (ii) $C_1$–$C_{10}$ alkyl or aryl of 1–2 rings, optionally substituted with hydroxyl, lower alkyl, halogeno, silyl, or amino groups, or combinations thereof, (iii) silyl optionally containing additional hydroxyl groups, or (iv) a metal optionally bound to one or more ligands and/or containing additional hydroxyl groups, to give a ceramic precursor in which hydrogen atoms in the hydridosiloxane starting material have been replaced by oxygen-containing pendant groups OR' or oxygen-containing bridging moieties;

(c) adding a metal powder, a ceramic powder, or both, either prior to, during, or after step (b), wherein a catalyst effective to activate Si—H bonds is added in step (b), step (c) or both, such that a preceramic mixture is provided;

(d) curing the preceramic mixture at a temperature between approximately 20° C. and 250° C., to provide a cured preceramic mixture;

(e) incorporating ceramic fibers into the preceramic mixture, either prior to or during step (d), to provide a fiber-containing preceramic mixture; and (f) pyrolyzing the fiber-containing preceramic mixture, at a temperature of at least about 500° C., to provide a fiber-reinforced ceramic matrix composite.

41. The ceramic matrix of claim 40, wherein the ceramic fibers are incorporated into the preceramic mixture prior to step (d).

42. The ceramic matrix composite of claim 40, wherein, in the hydroxyl-containing compound, R' is hydrogen or lower alkyl.

43. The ceramic matrix composite of claim 40, wherein, in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

44. A fiber-reinforced ceramic matrix composite prepared by the process comprising:

(a) providing a hydridosiloxane starting material containing a plurality of Si—H bonds, and wherein at least about 20% of the silicon atoms present in the starting material have a hydrogen atom bound thereto;

(b) introducing carbon-containing moieties into said hydridosiloxane starting material by reaction with a compound containing an unsaturated carbon-carbon bond, to give a ceramic precursor in which hydrogen atoms in the hydridosiloxane starting material have been replaced by pendant or bridging carbon-containing moieties;

(c) adding a metal powder, a ceramic powder, or both, either prior to, during, or after step (b), wherein a catalyst effective to activate Si—H bonds and unsaturated carbon-carbon bonds is added in step (b), step (c) or both, such that a preceramic mixture is provided;

(d) curing the preceramic mixture at a temperature between approximately 20° C. and 250° C., to provide a cured preceramic mixture;

(e) incorporating ceramic fibers into the preceramic mixture, either prior to or during step (d), to provide a fiber-containing preceramic mixture; and (f) pyrolyzing the fiber-containing preceramic mixture, at a temperature of at least about 500° C., to provide a fiber-reinforced ceramic matrix composite.

45. The ceramic matrix composite of claim 44, wherein the ceramic fibers are incorporated into the preceramic mixture prior to step (d).

46. The ceramic matrix composite of claim 44, wherein, in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

47. A ceramic matrix composite prepared by the process comprising:

(a) providing a hydridosiloxane starting material containing a plurality of Si—H bonds, and wherein at least about 20% of the silicon atoms present in the starting material have a hydrogen atom bound thereto;

(b) introducing nitrogen-containing moieties into said starting material by reaction with a compound HNR"$_2$ wherein the R" are independently selected from hydrogen, lower alkyl, silyl, and aryl of 1–2 rings, to give a ceramic precursor in which hydrogen atoms in the hydridosiloxane polymer have been replaced with nitrogen-containing pendant or crosslinking groups;

(c) adding a metal powder, a ceramic powder, or both, either prior to, during, or after step (b), wherein a catalyst effective to activate Si—H bonds is added in step (b), step (c) or both, such that a preceramic mixture is provided;

(d) curing the preceramic mixture at a temperature between approximately 20° C. and 250° C., to provide a cured preceramic mixture;

(e) incorporating ceramic fibers into the preceramic mixture, either prior to or during step (d), to provide a fiber-containing preceramic mixture; and (f) pyrolyzing the fiber-containing preceramic mixture, at a temperature of at least about 500° C., to provide a fiber-reinforced ceramic matrix composite.

48. The ceramic matrix of claim 47, wherein the ceramic fibers are incorporated into the preceramic mixture prior to step (d).

49. The ceramic matrix composite of claim 47, wherein, in the compound HNR"$_2$, the R" moieties are independently selected from the group consisting of hydrogen and lower alkyl.

50. The ceramic matrix composite of claim 47, wherein, in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

51. A fiber-reinforced ceramic matrix composite prepared by the process comprising:

(a) providing a hydridosiloxane starting material containing a plurality of Si—H bonds, and wherein at least about 20% of the silicon atoms present in the starting material have a hydrogen atom bound thereto;

(b) reacting said hydridosiloxane starting material with a compound selected from the group consisting of ML$_a$ and L$_a$M-OH, wherein M is a metal atom, L is an organic or inorganic ligand associated therewith, and a represents the molar ratio L/M, to give a ceramic precursor in which said activated Si—H bonds have been replaced by Si—M bonds;

(c) adding a metal powder, a ceramic powder, or both, either prior to, during, or after step (b), wherein a catalyst effective to activate Si—H bonds is added in step (b), step (c) or both, such that a preceramic mixture is provided;

(d) curing the preceramic mixture at a temperature between approximately 20° C. and 250° C., to provide a cured preceramic mixture;

(e) incorporating ceramic fibers into the preceramic mixture, either prior to or during step (d), to provide a fiber-containing preceramic mixture; and (f) pyrolyzing the fiber-containing preceramic mixture, at a temperature of at least about 500° C., to provide a fiber-reinforced ceramic matrix composite.

52. The ceramic matrix composite of claim 51, wherein the ceramic fibers are incorporated into the preceramic mixture prior to step (d).

53. The ceramic matrix composite of claim 51, wherein, in step (c), the ceramic precursor is admixed with a metal powder selected from the group consisting of aluminum, barium, boron, calcium, copper, hafnium, iron, magnesium, molybdenum, niobium, silicon, titanium, tungsten, yttrium and zirconium.

54. A fiber-reinforced ceramic matrix composite prepared by the process comprising:
 (a) providing a starting material comprising a silicon-containing polymer having a plurality of Si—H groups;
 (b) curing said silicon-containing polymer with light, by dehydrocoupling or by reaction with a coupling agent, to provide a ceramic precursor;
 (c) admixing (i) a catalyst effective to activate Si—H bonds, and (ii) a metal powder, with either the silicon-containing polymer, the ceramic precursor, or both, to provide a preceramic mixture;
 (d) incorporating ceramic fibers into the preceramic mixture to provide a fiber-containing preceramic mixture; and
 (e) pyrolyzing the fiber-containing preceramic mixture, at a temperature of at least about 500° C., to provide a fiber-reinforced ceramic matrix composite.

55. The method of claim 13, wherein, in the compound $HNR''_a$, the R" moieties are independently selected from the group consisting of hydrogen and lower alkyl.

* * * * *